United States Patent
Finn et al.

(10) Patent No.: US 7,762,470 B2
(45) Date of Patent: Jul. 27, 2010

(54) RFID TOKEN WITH MULTIPLE INTERFACE CONTROLLER

(75) Inventors: David Finn, Tourmakeady (IE); Dennis Ryan, Tipp City, OH (US)

(73) Assignee: DPD Patent Trust Ltd., Tourmakeady, County Mayo (IE)

( * ) Notice: Subject to any disclaimer, the term of this patent is extended or adjusted under 35 U.S.C. 154(b) by 1170 days.

(21) Appl. No.: 11/355,264

(22) Filed: Feb. 15, 2006

(65) Prior Publication Data

US 2006/0208066 A1    Sep. 21, 2006

Related U.S. Application Data

(63) Continuation-in-part of application No. 11/295,685, filed on Dec. 6, 2005, now Pat. No. 7,632,113, and a continuation-in-part of application No. 10/990,296, filed on Nov. 16, 2004, now Pat. No. 7,213,766.

(60) Provisional application No. 60/652,895, filed on Feb. 15, 2005, provisional application No. 60/660,398, filed on Mar. 10, 2005, provisional application No. 60/664,974, filed on Mar. 24, 2005, provisional application No. 60/734,409, filed on Nov. 8, 2005, provisional application No. 60/725,818, filed on Oct. 12, 2005, provisional application No. 60/708,707, filed on Aug. 16, 2005, provisional application No. 60/708,628, filed on Aug. 16, 2005, provisional application No. 60/691,337, filed on Jun. 16, 2005, provisional application No. 60/685,503, filed on May 27, 2005, provisional application No. 60/633,541, filed on Dec. 6, 2004, provisional application No. 60/602,595, filed on Aug. 18, 2004, provisional application No. 60/562,204, filed on Apr. 14, 2004, provisional application No. 60/520,698, filed on Nov. 17, 2003.

(51) Int. Cl.
*G06K 19/06* (2006.01)
*G06K 19/00* (2006.01)
*G06K 7/00* (2006.01)
*G06K 5/00* (2006.01)
*G08B 13/14* (2006.01)

(52) U.S. Cl. .............. 235/492; 235/380; 235/435; 235/487; 340/572.1; 340/572.8

(58) Field of Classification Search .............. 235/492, 235/380, 435, 441, 449, 451; 711/115; 340/7.63, 340/572.1, 572.8
See application file for complete search history.

(56) References Cited

U.S. PATENT DOCUMENTS 4,367,965 A    1/1983    Speitel et al.
(Continued)

FOREIGN PATENT DOCUMENTS

DE    19631050    2/1998
(Continued)

OTHER PUBLICATIONS

*ACR38DT Dual Key Technical Specifications*, Version 1.3, Sep. 2004, Advanced Card Systems Ltd., Hong Kong.

(Continued)

*Primary Examiner*—Daniel Walsh
(74) *Attorney, Agent, or Firm*—Gerald E Linden; Dwight A. Stauffer

(57) ABSTRACT

An RFID token apparatus has a connection module for interfacing with an appliance capable of communicating and interacting with remote servers and networks, a translation module for moving signals between a USB interface and a smart card interface, a processor module which may be capable of operating as a dual-interface (DI) chip; and an input/output module having at least one RF antenna and a modulator. An RFID-contactless interface according to ISO 14443 & ISO 15693 and/or NFC. A wireless interface according to ZIGBEE wireless, BLUETOOTH wireless, WLAN 802.11, UWB, USB wireless and/or any similar interface. An RFID reader apparatus has a housing; a slot for a contact or contactless fob; and a USB stick alternately protruding from the housing and retracted within the housing.

13 Claims, 5 Drawing Sheets

U.S. PATENT DOCUMENTS

| | | | |
|---|---|---|---|
| 5,761,648 | A | 6/1998 | Golden et al. |
| 5,773,812 | A | 6/1998 | Kreft |
| 6,067,235 | A | 5/2000 | Finn et al. |
| 6,085,320 | A | 7/2000 | Kaliski, Jr. |
| 6,148,354 | A | 11/2000 | Ban et al. |
| 6,168,077 | B1 | 1/2001 | Gray et al. |
| 6,189,098 | B1 | 2/2001 | Kaliski, Jr. |
| 6,240,184 | B1 | 5/2001 | Huynh et al. |
| 6,283,658 | B1 | 9/2001 | Estevez et al. |
| 6,342,839 | B1 | 1/2002 | Curkendall et al. |
| 6,370,603 | B1 | 4/2002 | Silverman et al. |
| 6,385,677 | B1 | 5/2002 | Yao |
| 6,398,116 | B1 | 6/2002 | Kreft |
| 6,505,773 | B1 | 1/2003 | Palmer et al. |
| 6,543,690 | B2 | 4/2003 | Leydier et al. |
| 6,567,273 | B1 | 5/2003 | Liu et al. |
| 6,658,516 | B2 | 12/2003 | Yao |
| 6,694,399 | B1 | 2/2004 | Leydier et al. |
| 6,724,680 | B1 | 4/2004 | Ng et al. |
| 6,744,634 | B2 | 6/2004 | Yen |
| 6,748,541 | B1 | 6/2004 | Margalit et al. |
| 6,752,321 | B1 | 6/2004 | Leaming |
| 6,763,399 | B2 | 7/2004 | Margalit et al. |
| 6,772,956 | B1 | 8/2004 | Leaming |
| 6,798,169 | B2 | 9/2004 | Stratmann et al. |
| 6,801,956 | B2 | 10/2004 | Feuser et al. |
| 6,813,164 | B2 | 11/2004 | Yen |
| 6,839,772 | B1 | 1/2005 | Kowalski et al. |
| 6,848,045 | B2 | 1/2005 | Long et al. |
| 6,876,420 | B2 | 4/2005 | Hong et al. |
| 6,879,597 | B2 | 4/2005 | Tordera et al. |
| 6,983,888 | B2 | 1/2006 | Weng |
| 7,248,834 | B2 | 7/2007 | Matsuo et al. |
| 7,597,250 | B2 * | 10/2009 | Finn .......................... 235/380 |
| 2001/0043702 | A1 | 11/2001 | Elteto et al. |
| 2001/0054148 | A1 * | 12/2001 | Hoornaert et al. ........... 713/172 |
| 2002/0011516 | A1 * | 1/2002 | Lee ............................ 235/380 |
| 2002/0053735 | A1 * | 5/2002 | Neuhaus et al. ............. 257/728 |
| 2003/0000267 | A1 | 1/2003 | Jacob et al. |
| 2003/0028797 | A1 | 2/2003 | Long et al. |
| 2003/0087601 | A1 * | 5/2003 | Agam et al. .................. 455/39 |
| 2003/0102380 | A1 | 6/2003 | Spencer |
| 2003/0141365 | A1 | 7/2003 | Sowa et al. |
| 2003/0169152 | A1 | 9/2003 | Charrat et al. |
| 2003/0220876 | A1 * | 11/2003 | Burger et al. ................. 705/50 |
| 2003/0236821 | A1 | 12/2003 | Jiau |
| 2004/0030601 | A1 * | 2/2004 | Pond et al. .................... 705/16 |
| 2004/0073726 | A1 * | 4/2004 | Margalit et al. ............... 710/72 |
| 2004/0188519 | A1 * | 9/2004 | Cassone ..................... 235/382 |
| 2005/0109841 | A1 | 5/2005 | Finn |
| 2005/0212690 | A1 * | 9/2005 | Nishikawa ............... 340/932.2 |
| 2005/0274803 | A1 * | 12/2005 | Lee ............................ 235/439 |
| 2006/0148404 | A1 | 7/2006 | Wakim |
| 2006/0219776 | A1 * | 10/2006 | Finn .......................... 235/380 |
| 2007/0055633 | A1 | 3/2007 | Cheon et al. |
| 2007/0250707 | A1 | 10/2007 | Noguchi |
| 2007/0263596 | A1 | 11/2007 | Carrat |
| 2008/0014867 | A1 * | 1/2008 | Finn .......................... 455/41.1 |
| 2008/0032626 | A1 | 2/2008 | Chen |
| 2009/0006699 | A1 * | 1/2009 | Rofougaran ................ 710/304 |

FOREIGN PATENT DOCUMENTS

| | | |
|---|---|---|
| DE | 100 60 866 C1 | 2/2002 |
| HK | 1063994 | 12/2004 |
| HK | 1063995 | 12/2004 |
| JP | 2004246720 | 9/2004 |
| WO | WO99 38062 | 7/1999 |
| WO | WO99 52051 | 10/1999 |
| WO | WO00 36252 | 6/2000 |
| WO | WO00 42491 | 7/2000 |
| WO | WO00 65180 | 11/2000 |
| WO | WO00 75755 | 12/2000 |
| WO | WO01 14179 | 3/2001 |
| WO | WO01 38673 | 3/2001 |
| WO | WO01 48339 | 7/2001 |
| WO | WO01 48342 | 7/2001 |
| WO | WO01 61692 | 8/2001 |
| WO | WO01 39102 | 11/2001 |
| WO | WO01 88693 | 11/2001 |
| WO | WO01 96990 | 12/2001 |
| WO | WO03 014887 | 2/2003 |
| WO | WO03 034189 | 4/2003 |
| WO | WO04 002058 | 12/2003 |
| WO | WO2004 081706 | 9/2004 |
| WO | WO2004/081769 | 9/2004 |
| WO | WO2005 022288 | 3/2005 |

OTHER PUBLICATIONS

*Matsushita blends FERAM technology with smart cards*, Hara, Yoshiko, EE Times, Oct. 1, 2004, CMP Media, Manhasset NY.

*Japan's Matsushita developing memory cards with smart chip function*, Oct. 1, 2004, Mercury News, San Jose CA.

*Panasonic Develops RFID smartSD Card*, Oct. 4, 2004, Palminfocenter.com, Sunnyvale CA.

*Panasonic Develops Industry's First SD Memory Card with Contacless Smart Card Capabilities*, Oct. 1, 2004, The Japan Corporate News Network, Tokyo.

*Panasonic's Smart SD adds RFID to the mix*, Rojas, Peter, Oct. 4, 2004, Engadget LLC, New York NY.

*Delivering ultimate security, high performance and ultra low power consumption, SmartMX is now in volume supply*, Nov. 18-20, 2003, Cartes 2003, aris Nort Villepinte, France.

*Digital Rights pits SIMS against Flash Cards, Card Technology*, Balaban, Dan, Nov. 2004, pp. 24, 25, 26, 28, 30, Card Technology, Chicago IL.

*Smart MX P5CT072 Secure Dual Interface PKI Smart Card Controller, Rev. 1.3*, Oct. 2004, Koninklijke Philips Electronics NV, The Netherlands.

*Vodafone KK Develops Contactless Smart Card Mobile Handset*, May 6, 2004, HiTEK Magazine, Dubai.

* cited by examiner

RFID TOKEN WITH MULTIPLE INTERFACE CONTROLLER

CROSS-REFERENCE TO RELATED APPLICATIONS

This is a continuation-in-part of U.S. Ser. No. 10/990,296 filed Nov. 16, 2004 now U.S. Pat. No. 7,213,766.

This is a continuation-in-part of U.S. Ser. No. 11/295,685 filed Dec. 6, 2005 now U.S. Pat. No. 7,632,113.

This is a non-provisional filing of U.S. Ser. No. 60/652,895 filed Feb. 15, 2005.

This is a non-provisional filing of U.S. Ser. No. 60/660,398 filed Mar. 10, 2005.

This is a non-provisional filing of U.S. Ser. No. 60/664,974 filed Mar. 24, 2005.

Priority is claimed from the following:

Provisional Application No. 60/734,409 filed Nov. 8, 2005
Provisional Application No. 60/725,818 filed Oct. 12, 2005
Provisional Application No. 60/708,707 filed Aug. 16, 2005
Provisional Application No. 60/708,628 filed Aug. 16, 2005
Provisional Application No. 60/691,337 filed Jun. 16, 2005
Provisional Application No. 60/685,503 filed May 27, 2005
Provisional Application No. 60/664,974 filed Mar. 24, 2005
Provisional Application No. 60/660,398 filed Mar. 10, 2005
Provisional Application No. 60/652,895 filed Feb. 15, 2005
Patent application Ser. No. 11/295,685 filed Dec. 6, 2005, claiming priority of Provisional Application No. 60/633,541 filed Dec. 6, 2004
Patent application Ser. No. 10/990,296 filed Nov. 16, 2004, claiming priority of Provisional Application No. 60/602,595 filed Aug. 18, 2004
Provisional Application No. 60/562,204 filed Apr. 14, 2004
Provisional Application No. 60/520,698 filed Nov. 17, 2003 all of which are incorporated by reference herein, and all of which name Finn as an inventor.

TECHNICAL FIELD OF THE INVENTION

This invention relates generally to RFID technology, and also to smart card technology.

BACKGROUND OF THE INVENTION

A smart card resembles a credit card in size and shape. (See ISO 7810). The inside of a smart card usually contains an embedded 8-bit microprocessor. The microprocessor is under a gold contact pad on one side of the card. Smarts cards may typically have 1 kilobyte of RAM, 24 kilobytes of ROM, 16 kilobytes of programmable ROM, and an 8-bit microprocessor running at 5 MHz. The smart card uses a serial interface and receives its power from external sources like a card reader. The processor uses a limited instruction set for applications such as cryptography. The most common smart card applications are:

Credit cards
Electronic cash
Computer security systems
Wireless communication
Loyalty systems (like frequent flyer points)
Banking
Satellite TV
Government identification Smart cards can be used with a smart-card reader attachment to a personal computer to authenticate a user. (However, these readers are relatively costly, and have not been well accepted by users.) Web browsers also can use smart card technology to supplement Secure Sockets Layer (SSL) for improved security of Internet transactions. The American Express Online Wallet shows how online purchases work using a smart card and a PC equipped with a smart-card reader. Smart-card readers can also be found in vending machines.

There are three basic types of smart cards: contact chip, contactless and dual interface (DI) cards.

A contact smart card (or contact chip card) is a plastic card about the size of a credit card that has an embedded integrated circuit (IC) chip to store data. This data is associated with either value or information or both and is stored and processed within the card's chip, either a memory or microprocessor device.

The predominant contact smart cards in consumer use are telephone cards as a stored value tool for pay phones and bank cards for electronic cash payments. Contact smart cards require the placement of the card in a terminal or automatic teller machine for authentication and data transaction. By inserting the contact smart card into the terminal, mechanical and electrical contact is made with the embedded chip module.

Contactless smart cards have an embedded antenna connected to a microchip, enabling the card to pick up and respond to radio waves. The energy required for the smart card to manipulate and transmit data is derived from the electromagnetic field generated by a reader. Contactless smart cards do not require direct contact with the reader because they employ the passive transponder technology of Radio Frequency Identification (RFID). By just waving the card near the reader, secure identification, electronic payment transaction and authentication are completed in milliseconds.

Contactless chip card technology is based on two standards: ISO/IEC 14443 Type A and Type B (for proximity cards), and ISO/IEC 15693 (for vicinity cards). Cards that comply with these standards operate at the 13.56 MHz frequency. ISO/IEC 14443 products have a range of up to 10 cm (centimeters), while ISO/IEC 15693 products can operate at a range between 50 and 70 cm.

Dual interface (DI) cards, sometimes called combination chip cards, are microprocessor multi-function cards that incorporate both the functions of a contact chip card and a contactless card. Within the smart card is a microprocessor or micro-controller chip with radio frequency identification (RFID) capability that manages the memory allocation and file access. The on-board memory is shared and can be accessed either in contact or contactless mode.

This type of chip is similar to those found inside all personal computers and when implanted in a smart card, manages data in organized file structures, via a card operating system. This capability permits different and multiple functions and/or different applications to reside on the card.

A dual interface (DI) card is ideal for single and multi-application markets ranging from micro-payment (convenient alternative to low value cash transaction) to e-commerce and from ticketing in mass transit to secure identification for cross border control. Originally, such cards were intended to be used in conjunction with a reader connected to a PC for downloading tickets, tokens, or electronic money via the contact interface and used in contactless mode in the application for physical access or proximity payment Passive radio frequency identification (RFID) devices derive their energy from the electromagnetic field radiated from the reader. Because of international power transmission restrictions at the frequencies of 125 KHz and 13,56 MHz, the contactless integrated circuits are generally low voltage and low power devices. Read/Write circuits use low voltage EEPROM and low power analogue cells. The read/write memory capacity in transponders, contact smart cards, contactless memory based smart cards, dual interface smart cards (contact & contactless) and multi-interface micro-controllers is generally limited to approximately 64 kilobytes.

The dual interface (DI) smart cards typically have an 8, 16 or 32 bit microprocessor controller, operate at a low voltage of 1.8V-5V and run at an internal frequency of 5 or 15 MHz. The open platform architecture includes memory management, non volatile memory, contactless interfaces and security features such as Advanced Crypto Engine (ACE) 1100 bit, triple DES encryption and RSA.

High performance crypto controllers with multiple interfaces such as USB, ISO 14443 Type A, B, Felica have been developed for multi-functional smart cards in applications such as security access, healthcare, electronic purse, banking etc.

The main focus of the smart card industry has been on secure card applications where large memory capacity is not of paramount importance, and/or where pertinent information and application software is stored at a centralized server location.

Copending U.S. patent application Ser. No. 10/990,296 (the '296 application) generally discloses a compact personal token apparatus, suitably resembling a conventional USB memory fob in size, shape, and form which can be plugged into a PC and interfaced with the virtual world of the Internet. The apparatus is capable of loading and storing information from the Internet, via the PC to its flash memory or EEPROM and then using the stored information or value via its contactless or wireless interface in the real world. The apparatus is capable of implementing an auto-run application, when inserted into a personal computer. The apparatus is capable of exchanging information with other devices having compatible interfaces. The apparatus can also function as a firewall when plugged between an Internet connection and a PC.

Apart from using USB tokens for file storage, they are also used for desktop settings, screen lock, network login & access control, log book, user authentication (storing digital signatures, certificates, key sets, finger-based biometric templates, usernames and passwords), digital content and transaction security as well as enterprise and Internet security.

A USB token can also be used to download emails, remotely access a PC or to open a customized browser that allows the user to surf the Web with total privacy.

Recent developments in USB flash memory drives have resulted in CDROM-like auto-run devices that automatically execute a file when the USB token is inserted into a PC. The read-only and auto-run contents are installed during the manufacturing process. Examples of auto-run contents include opening a website, running a demo application, showing a presentation, making a product pitch, providing customers with discount coupons etc.

U.S. Pat. No. 6,763,399, incorporated by reference herein, entitled "USB key apparatus for interacting with a USB host via a USB port" describes a smart card—host system that operates without the intermediation of a smart card reader. The smart card—host system comprises a host, which has a USB interface, and a portable device, which provides smart card function(s). The portable device has a smart card chip for performing the smart card function(s); a USB interface for connecting the portable device with the host via USB protocol; and a microprocessor for controlling the transfer of data between the USB interface and the smart card chip, for converting data from a USB format to the format of the smart card chip and for converting data from the format of the smart card chip to a USB format.

U.S. Pat. No. 6,801,956, incorporated by reference herein, entitled "Arrangement with a Microprocessor" describes an arrangement with a microprocessor, particularly a microprocessor for use in a chip card. The arrangement includes a microprocessor, which is connected to at least a USB interfaces and an ISO interface for exchanging data signals. A selection unit within the microprocessor may be configured to select between the USB and ISO interfaces, and a switching unit within the microprocessor may be configured to subsequently switch between the USB and ISO interfaces by initiating an internal reset of the microprocessor.

International Patent Publication No. WO 01/96990, incorporated by reference herein, entitled "USB-Compliant Personal Key using a Smartcard Processor and a Smartcard Reader Emulator" describes a compact, self-contained, personal key. The personal key comprises a USB-compliant interface releaseably coupleable to a host processing device operating under command of an operating system; a smartcard processor having a smartcard processor-compliant interface of communicating according to a smartcard input and output protocol; and an interface processor, communicatively coupled to the USB-compliant interface and to the smartcard processor-compliant interface, the interface processor implementing a translation module for interpreting USB-compliant messages into smartcard processor-compliant messages and for interpreting smartcard processor-compliant messages into USB-compliant messages.

U.S. Patent Publication No. 2003/0236821, incorporated by reference herein, describes a body wearable personal network server device having a display, function keys, alarm output indicators, a disk drive to receive and store client's data, and communication devices to communicate to its clients, such as mobile phone, personal digital assistant (PDA), personal computer, and notebook computer. A body wearable personal network device also containing software modules; such as a protocol handler to handle Internet based protocols XML/FTP/HTTP/TCP/IP, diagnostic system to automatically transmit of notification messages to its clients, and various applications to provide various services for its clients. A body wearable personal network device having gate way functionality between PAN (using BLUETOOTH wireless) and WLAN (using IEEE 802.11b).

U.S. Pat. No. 6,148,354, incorporated by reference herein, describes a flash memory device, containing one or more flash modules, in which the flash memory is mapped to the address space of an ASIC or a controller which has a USB-defined electrical interface and a USB-defined logical interface. This controller/ASIC (hereinafter termed a "controller") supports the USB functionality according to the USB standard, thereby supporting enumeration onto the USB bus, as well as data reception and transmission over USB pipes to and from USB endpoints. This controller also supports the functionality and control of the flash memory device, as well as the processing of command and data packets from the host controller. The host controller uses one of several possible protocols, either standard or proprietary, to signal the next command to be performed to the USB flash controller. Thus, the entire device acts as a dynamically attachable/detachable non-volatile storage device for the host platform. The primary function of the controller is memory management and to directly interface between the host computing device and the flash memory.

U.S. Pat. No. 6,763,399 ("Alladin"), incorporated by reference herein, describes a portable device, for providing smart card function(s), said portable device having thereon a smart card chip, for performing said smart card function(s), a USB interface, for connecting said portable device with said host via USB protocol; and a microprocessor, for enabling at least one function selected from the group consisting of controlling the transfer of data between said USB interface and said smart card chip, for converting data from a USB format to the format of said smart card chip and for converting data from the format of said smart card chip to a USB format. The portable device is configured to translate the USB communications from USB protocol, into smart card protocol such as an ISO 7816 protocol, and from smart card protocol into USB protocol and a smart card chip operative to perform at least one smart card function such as authentication, encryption, access control and secure memory. In Alladin, the term "smart card" refers to a plastic card with an embedded chip, which interacts with a smart card reader.

Patent Publication WO01/61692, incorporated by reference herein, describes a portable data storage device comprising a coupling device for coupling to a computer serial bus, an interface device coupled to the coupling device, a memory control device and a non-volatile solid-state memory device; the memory control device being coupled between the interface device and the memory device to control the flow of data from the memory device to the coupling device. The interface device comprises of a universal serial bus (USB) driver to convert data between a USB format and a PC format. Alternatively, the interface device comprises of a driver for IEEE 1394 (FireWire) protocol. The configuration as described is a modular approach to the memory management controller provided in the U.S. Pat. No. 6,148,354.

Patent Publication No. WO00/42491, incorporated by reference herein, describes a cryptographic USB token as a compact personal token, comprising: a USB-compliant interface releasably coupleable to a host processing device; a memory; a processor, communicatively coupled to the memory and communicatively coupleable to the host processing device via the USB-compliant interface, the processor for providing the host processing device conditional access to data storable in the memory; and a user input device, communicatively coupled to the processor by a path distinct from the USB-compliant interface". The compact personal token or key as described includes a processor and a memory which implements software protection schemes to prevent copying and unauthorized use. The personal key provides for the storage and management of digital certificates, allowing the user to store all of his or her digital certificates in one media that is portable from platform to platform. In another embodiment, the personal key comprises a biometric sensor disposed to measure biometrics such as fingerprint data. The biometric sensor measures characteristics of the person holding the key (such as fingerprints) to confirm that the person possessing the key is the actual owner of the key.

GLOSSARY, DEFINITIONS, BACKGROUND

The following terms may be used throughout the descriptions presented herein and should generally be given the following meaning unless contradicted or elaborated upon by other descriptions set forth herein. Many of the definitions below were taken from World Wide Web at webopedia.com. Some of the terms set forth below may be registered trademarks (®).

ADPCM Short for Adaptive Differential Pulse Code Modulation. ADPCM is a form of pulse code modulation (PCM) that produces a digital signal with a lower bit rate than standard PCM. ADPCM produces a lower bit rate by recording only the difference between samples and adjusting the coding scale dynamically to accommodate large and small differences. Some applications use ADPCM to digitize a voice signal so voice and data can be transmitted simultaneously over a digital facility normally used only for one or the other.

ATA Short for Advanced Technology Attachment. ATA is a disk drive implementation that integrates the controller on the disk drive itself. There are several versions of ATA, all developed by the Small Form Factor (SFF) Committee:

ATA: Known also as IDE, supports one or two hard drives, a 16-bit interface and PIO modes 0, 1 and 2.

ATA-2: Supports faster PIO modes (3 and 4) and multiword DMA modes (1 and 2). Also supports logical block addressing (LBA) and block transfers. ATA-2 is marketed as Fast ATA and Enhanced IDE (EIDE).

ATA-3: Minor revision to ATA-2.

Ultra-ATA: Also called Ultra-DMA, ATA-33, and DMA-33, supports multiword DMA mode 3 running at 33 MBps.

ATA/66: A version of ATA proposed by Quantum Corporation, and supported by Intel, that doubles ATA's throughput to 66 MBps.

ATA/100: An updated version of ATA/66 that increases data transfer rates to 100 MBps.

ATA is also called Parallel ATA. Contrast with Serial ATA

SERIAL ATA Often abbreviated SATA or S-ATA, an evolution of the Parallel ATA physical storage interface. Serial ATA is a serial link—a single cable with a minimum of four wires creates a point-to-point connection between devices. Transfer rates for Serial ATA begin at 150 MBps. One of the main design advantages of Serial ATA is that the thinner serial cables facilitate more efficient airflow inside a form factor and also allow for smaller chassis designs. In contrast, IDE cables used in parallel ATA systems are bulkier than Serial ATA cables and can only extend to 40 cm long, while Serial ATA cables can extend up to one meter. Serial ATA supports all ATA and ATAPI devices. Source: World Wide Web at webopedia.com AVI Short for Audio Video Interleave. AVI is the file format for Microsoft's Video for Windows standard.

BLUETOOTH wireless A wireless technology developed by Ericsson, Intel, Nokia and Toshiba that specifies how mobile phones, computers and PDAs interconnect with each other, with computers, and with office or home phones. The technology enables data connections between electronic devices in the 2.4 GHz range at 720 Kbps (kilo bits per second) within a 30-foot range. BLUETOOTH wireless uses low-power radio frequencies to transfer information wirelessly between similarly equipped devices. BLUETOOTH wireless wireless technology supports ad hoc networking, enables devices from many different manufacturers to pair with each other and establishes secure connections "on the fly". It is good at real-time data in synchronous connected oriented mode, but requires relatively high power, so is unsuitable for extremely small battery-powered applications.

Byte A binary digital signal is essentially a string of ones and zeros—in other words, one voltage level or another, typically with no values in-between. Since having only two fingers (or one, depending on how you count) is not a very useful means of representing a wide number of variables, such as letters of the alphabet, it soon became apparent to bundle bits into bytes, such as eight bits to a byte. An 8-bit byte can represent 28=256 different values, generally plenty for representing letters of an alphabet, numerals and special characters. When more different values are needed, the bytes can be made longer (more bits per byte), or bytes can be strung together into words. MB is short for megabyte, one million bytes.

Challenge-Response An OTP method in which a challenge is entered or sent to the token and this challenge is combined with the credential through an algorithm to create a response (the OTP).

Client The client part of a client-server architecture. Typically, a client is an application that runs on a personal computer or workstation and relies on a server to perform some operations. For example, an e-mail client is an application that enables you to send and receive e-mail.

Computer A programmable machine. The two principal characteristics of a computer are:
  It responds to a specific set of instructions in a well-defined manner.
  It can execute a pre-recorded list of instructions (a program).
  Modern computers are electronic and digital. The actual machinery—wires, transistors, and circuits—is called hardware; the instructions and data are called software.

Data Transmission Rates
  ZIGBEE wireless devices have a radio bit rate of 250 kbps as specified by IEEE 802.15.4
  Near Field Communication (NFC) has a data exchange speed up to 424 kbps
  BLUETOOTH wireless 2.0 devices operate at data rates below 3 megabits per second
  WiFi can deliver data rates of up to 54 megabits per second using a shared, unlicensed radio band at 2.4 GHz
  Ultra-Wideband (UWB) technology supports up to 480 megabits per second with a roadmap to 1 gigabit per second over short distances DHCP Short for Dynamic Host Configuration Protocol. DHCP is a protocol for assigning dynamic IP addresses to devices on a network. With dynamic addressing, a device can have a different IP address every time it connects to the network. In some systems, the device's IP address can even change while it is still connected. DHCP also supports a mix of static and dynamic IP addresses. Dynamic addressing simplifies network administration because the software keeps track of IP addresses rather than requiring an administrator to manage the task. This means that a new computer can be added to a network without the hassle of manually assigning it a unique IP address. Many ISPs use dynamic IP addressing for dial-up users.

DMA Short for direct memory access. DMA is a technique for transferring data from main memory to a device without passing it through the CPU. Computers that have DMA channels can transfer data to and from devices much more quickly than computers without a DMA channel can. This is useful for making quick backups and for real-time applications.

DRM Short for digital rights management. DRM is a system for protecting the copyrights of data circulated via the Internet or other digital media by enabling secure distribution and/or disabling illegal distribution of the data. Typically, a DRM system protects intellectual property by either encrypting the data so that it can only be accessed by authorized users or marking the content with a digital watermark or similar method so that the content can not be freely distributed.

Ethernet A local-area network (LAN) architecture developed by Xerox Corporation in cooperation with DEC and Intel in 1976. Ethernet uses a bus or star topology and supports data transfer rates of 10 Mbps. The Ethernet specification served as the basis for the IEEE 802.3 standard, which specifies the physical and lower software layers. Ethernet uses the CSMA/CD access method to handle simultaneous demands. It is one of the most widely implemented LAN standards. A newer version of Ethernet, called 100Base-T (or Fast Ethernet), supports data transfer rates of 100 Mbps. And the newest version, Gigabit Ethernet supports data rates of 1 gigabit (1,000 megabits) per second.

Firewall A system designed to prevent unauthorized access to or from a private network. Firewalls can be implemented in both hardware and software, or a combination of both. Firewalls are frequently used to prevent unauthorized Internet users from accessing private networks connected to the Internet, especially intranets. All messages entering or leaving the intranet pass through the firewall, which examines each message and blocks those that do not meet the specified security criteria. There are several types of firewall techniques:
  Packet filter: Looks at each packet entering or leaving the network and accepts or rejects it based on user-defined rules. Packet filtering is fairly effective and transparent to users, but it is difficult to configure. In addition, it is susceptible to IP spoofing.
  Application gateway: Applies security mechanisms to specific applications, such as FTP and Telnet servers. This is very effective, but can impose a performance degradation.
  Circuit-level gateway: Applies security mechanisms when a TCP or UDP connection is established. Once the connection has been made, packets can flow between the hosts without further checking.
  Proxy server: Intercepts all messages entering and leaving the network. The proxy server effectively hides the true network addresses.
  In practice, many firewalls use two or more of these techniques in concert. A firewall is considered a first line of defense in protecting private information. For greater security, data can be encrypted.

Flash Memory A special type of EEPROM that can be erased and reprogrammed in blocks instead of one byte at a time. Many modern PCs have their BIOS stored on a flash memory chip so that it can easily be updated if necessary. Such a BIOS is sometimes called a flash BIOS. Flash memory is also popular in modems because it enables the modem manufacturer to support new protocols as they become standardized.

I2C Short for Inter-IC. I2C is a type of bus designed by Philips Semiconductors in the early 1980s, which is used to connect integrated circuits (ICs) I2C is a multi-master bus, which means that multiple chips can be connected to the same bus and each one can act as a master by initiating a data transfer. I2C is used in many devices, especially video devices such as computer monitors, televisions and VCRs.

IDE Short for either Intelligent Drive Electronics or Integrated Drive Electronics. An IDE interface is an interface for mass storage devices, in which the controller is integrated into the disk or CD-ROM drive. Although it really refers to a general technology, most people use the term to refer the ATA specification, which uses this technology. Refer to ATA for more information.

IEEE Short for "Institute of Electrical and Electronics Engineers". The IEEE is best known for developing standards for the computer and electronics industry.

IEEE 802.11 The IEEE standard for wireless Local Area Networks (LANs). It uses three different physical layers, 802.11a, 802.11b and 802.11g.

IEEE 1394 IEEE 1394 (also known as FireWire® and iLINK™) is a high-bandwidth isochronous (real-time) interface for computers, peripherals, and consumer electronics products such as camcorders, VCRs, printers, PCs, TVs, and digital cameras. With IEEE 1394-compatible products and systems, users can transfer video or still images from a camera or camcorder to a printer, PC, or television (TV), with no image degradation.

IEEE 802.15.4/ZIGBEE wireless is intended as a specification for low-powered networks for such uses as wireless monitoring and control of lights, security alarms, motion sensors, thermostats and smoke detectors. 802.15.4/ZIGBEE wireless is part of the IEEE 802.15 wireless personal area network standard and specifies the media access control (MAC) and physical (PHY) layers. It is a simple (28K byte) packet-based radio protocol aimed at very low-cost, battery-operated widgets and sensors (whose batteries last years, not hours) that can intercommunicate and send low-bandwidth data to a centralized device. 802.15.4/ZIGBEE wireless networks are slated to run in the unlicensed frequencies, including the 2.4-GHz band as well as the 915 MHz band in the US and 868 MHz in Europe.

Intranet A network based on TCP/IP protocols (an internet) belonging to an organization, usually a corporation, accessible only by the organization's members, employees, or others with authorization. An intranet's Web sites look and act just like any other Web sites, but the firewall surrounding an intranet fends off unauthorized access. Like the Internet itself, intranets are used to share information. Secure intranets are now the fastest-growing segment of the Internet because they are much less expensive to build and manage than private networks based on proprietary protocols.

JPEG Short for Joint Photographic Experts Group. JPEG is a lossy compression technique for color images. Although it can reduce files sizes to about 5% of their normal size, some detail is lost in the compression.

LAN Short for Local Area Network. A computer network that spans a relatively small area. Most LANs are confined to a single building or group of buildings. However, one LAN can be connected to other LANs over any distance via telephone lines and radio waves. A system of LANs connected in this way is called a wide-area network (WAN).

Latin A human language. Latin terms (abbreviations) may be used herein, as follows:
  cf. short for the Latin "confer". As may be used herein, "compare".
  e.g. short for the Latin "exempli gratia". Also "eg" (without periods). As may be used herein, means "for example".
  etc. short for the Latin "et cetera". As may be used herein, means "and so forth", or "and so on", or "and other similar things (devices, process, as may be appropriate to the circumstances)".
  i.e. short for the Latin "id est". As may be used herein, "that is".
  sic meaning "thus" or "just so". Indicates a misspelling or error in a quoted source.

MAC Short for Media Access Control address. MAC is a hardware address that uniquely identifies each node of a network. In IEEE 802 networks, the Data Link Control (DLC) layer of the OSI Reference Model is divided into two sublayers: the Logical Link Control (LLC) layer and the Media Access Control (MAC) layer. The MAC layer interfaces directly with the network medium. Consequently, each different type of network medium requires a different MAC layer. On networks that do not conform to the IEEE 802 standards but do conform to the OSI Reference Model, the node address is called the Data Link Control (DLC) address.

NFC Short for "Near Field Communication". NFC is a wireless connectivity technology that enables short-range communication between electronic devices. If two devices are held close together (for example, a mobile phone and a personal digital assistant), NFC interfaces establish a peer-to-peer protocol, and information such as phone book details can be passed freely between them. NFC devices can be linked to contactless smart cards, and can operate like a contactless smart card, even when powered down. This means that a mobile phone can operate like a transportation card, and enable fare payment and access to the subway.

NFC is an open platform technology standardized in ECMA (European Computer Manufacturers Association) 340 as well as ETSI (European Telecommunications Standards Institute) TS 102 190 V1.1.1 and ISO/IEC 18092. These standards specify the modulation schemes, coding, transfer speeds, and frame format of the RF interface of NFC devices, as well as initialization schemes and conditions required for data collision-control during initialization—for both passive and active modes.

Near Field Communications (NFC) technology addresses the need to simplify and expand the consumer's connectivity, content and commerce experiences in consumer electronics, digital media and personal wireless communications. Specifications:

Works by magnetic field induction and operates within the globally available and unregulated 13.56 MHz frequency band Maximum working distance: 1.5-2 meters Speed: 106 kbit/s, 212 kbit/s or 424 kbit/s Passive Communication Mode: The Initiator device provides a carrier field and the target device answers by modulating existing field. In this mode, the Target device may draw its operating power from the Initiator-provided electromagnetic field.

Active Communication Mode: Both, Initiator and Target device communicate by generating their own field. In this mode, both devices typically need to have a power supply.

NFC can be used to configure and initiate other wireless network connections such as BLUETOOTH wireless or WiFi. Extremely low power, one end can operate parasitically, that is, without battery and does not require complicated pairing, simply touch and go.

NOR NOR architecture is one of two technologies (the other being NAND) used in memory devices. NOR flash is the preferred technology for flash devices used to store and run code, usually in small capacities. NOR flash devices offer storage space up to 32-MB and while it has fast read capabilities it has slow write and slow erase functions compared to the NAND architecture. NOR technology is more commonly found as embedded designs and in lower-end set-top boxes and mobile handsets, and BIOS chips.

OLED Short for organic light-emitting diode. An OLED is a display device that sandwiches carbon-based films between two charged electrodes, one a metallic cathode and one a transparent anode, usually being glass. The organic films consist of a hole-injection layer, a hole-transport layer, an emissive layer and an electron-transport layer. When voltage is applied to the OLED cell, the injected positive and negative charges recombine in the emissive layer and create electro luminescent light. Unlike LCDs, which require backlighting, OLED displays are emissive devices—they emit light rather than modulate transmitted or reflected light.

OTP Short for One-Time Password. OTP provides a means of simply and securely proving the identity of a user. The end-user carries an authentication device or token. The user's token and the authentication server share a secret (the user's credential). OTPs support strong, two-factor authentication and allow organizations to authenticate-prove the identity of users before allowing them to login to the network.

PC Short for "Personal Computer". A PC is a single-user computer based on a microprocessor. In addition to the microprocessor, a personal computer has a keyboard for entering data, a monitor for displaying information, and a storage device for saving data.

Protocol An agreed-upon format for transmitting data between two devices. The protocol determines the following:
  the type of error checking to be used
  data compression method, if any
  how the sending device will indicate that it has finished sending a message
  how the receiving device will indicate that it has received a message RF Short for radio frequency. RF refers to that portion of the electromagnetic spectrum in which electromagnetic waves can be generated by alternating current fed to an antenna. Various "bands" are of interest here, including:
  Ultra high frequency (UHF) 300-3000 MHz used for television broadcasts, mobile phones, wireless LAN, ground-to-air and air-to-air communications
  Super high frequency (SHF) 3-30 GHz used for microwave devices, mobile phones (W-CDMA), WLAN, most modern radars RFID Short for "Radio Frequency Identification". An RFID device interacts, typically at a limited distance, with a "reader", and may be either "passive" (powered by the reader) or "active" (having its own internal power source, such as a battery).

RJ-45 Short for "Registered Jack 45". RJ-45 is an eight-wire connector used commonly to connect computers onto a local-area network (LAN), especially Ethernet. RJ-45 connectors look similar to the ubiquitous RJ-11 connectors used for connecting telephone equipment, but they are somewhat wider.

Serial Clock (SCLK)—a control line driven by the master, regulating the flow of data bits.

SI units The SI system of units defines seven SI base units: fundamental physical units defined by an operational definition, and other units which are derived from the seven base units, including:
  kilogram (kg), a fundamental unit of mass
  second (s), a fundamental unit of time
  meter, or metre (m), a fundamental unit of length
  ampere (A), a fundamental unit of electrical current
  kelvin (K), a fundamental unit of temperature
  mole (mol), a fundamental unit of quantity of a substance (based on number of atoms, molecules, ions, electrons or particles, depending on the substance)
  candela (cd), a fundamental unit luminous intensity
  degrees Celsius (° C.), a derived unit of temperature. t° C.=tK−273.15
  farad (F), a derived unit of electrical capacitance
  henry (H), a derived unit of inductance
  hertz (Hz), a derived unit of frequency
  ohm ($\Omega$), a derived unit of electrical resistance, impedance, reactance
  radian (rad), a derived unit of angle (there are $2\pi$ radians in a circle)
  volt (V), a derived unit of electrical potential (electromotive force)
  watt (W), a derived unit of power SIM Short for "Secure Identity Module" or "Subscriber Identification/Identity Module".

A SIM card inscribed with a customer's information and designed to be inserted into any mobile telephone. Usually SIM card phones work by GSM technology. The SIM card contains a user's GSM mobile account information. SIM cards are portable between GSM devices—the user's mobile subscriber information moves to whatever device houses the SIM.

Slave Select (SS)—a control line that allows slaves to be turned on and off with hardware control.

Software Computer instructions or data. Anything that can be stored electronically is software. Software is typically stored in binary form (ones and zeros, represented by two distinctive states) on a storage medium, such as a floppy disc, hard drive, memory device, or the like, all of which may generally and broadly be referred to as "hardware". The apparatus or system or device which responds to software instructions or manipulates software data may generally and broadly be referred to as a "computer". Software may also be characterized as the non-hardware part of a computer, handheld (e.g., PDA) or smartphone ("smart" cellular telephone) consisting of instructions used to operate these devices. Includes applications that are added to, or included on, the device, as well as the operating system built into a device. Software is sometimes abbreviated as "S/W". Software is often divided into the following two categories:
  systems software: Includes the operating system and all the utilities that enable the computer to function.
  applications software: Includes programs that do real work for users. For example, word processors, spreadsheets, and database management systems fall under the category of applications software.

SPI Short for Serial Peripheral Interface. SPI is a full-duplex synchronous serial interface for connecting low-/medium-bandwidth external devices using four wires.

SPI devices communicate using a master/slave relationship over two data lines and two control lines: Master Out Slave In (MOSI)—supplies the output data from the master to the inputs of the slaves. Master In Slave Out (MISO)—supplies the output data from a slave to the input of the master. It is important to note that there can be no more than one slave that is transmitting data during any particular transfer.

SSID Short for Service Set Identifier. SSID is a 32-character unique identifier attached to the header of packets sent over a WLAN that acts as a password when a mobile device tries to connect to the BSS. The SSID differentiates one WLAN from another, so all access points and all devices attempting to connect to a specific WLAN must use the same SSID. A device will not be permitted to join the BSS unless it can provide the unique SSID. Because an SSID can be sniffed in plain text from a packet it does not supply any security to the network. An SSID is also referred to as a network name because essentially it is a name that identifies a wireless network.

SRAM Short for static random access memory. SRAM is a type of memory that is faster and more reliable than the more common DRAM (dynamic RAM). The term static is derived from the fact that it doesn't need to be refreshed like dynamic RAM. While DRAM supports access times of about 60 nanoseconds, SRAM can give access times as low as 10 nanoseconds. In addition, its cycle time is much shorter than that of DRAM because it does not need to pause between accesses. Unfortunately, it is also much more expensive to produce than DRAM. Due to its high cost, SRAM is often used only as a memory cache.

SSO Short for Single Sign On. SSO is an authentication process in a client/server relationship where the user, or client, can enter one name and password and have access to more than one application or access to a number of resources within an enterprise. Single sign-on takes away the need for the user to enter further authentications when switching from one application to another.

TCP/IP Short for Transmission Control Protocol/Internet Protocol. TCP/IP is the language governing communications between all computers on the Internet. TCP/IP is a set of instructions that dictates how packets of information are sent across multiple networks. It also includes a built-in error-checking capability to ensure that data packets arrive at their final destination in the proper order.

Two-Factor Authentication A strong means of proving identity in which a user enters something he knows (e.g., a PIN) and something he or she has (the OTP displayed or generated by his or her token).

Units of Length Various units of length may be used or referred to herein, as follows:
  meter (m) A meter is the SI unit of length, slightly longer than a yard.
    1 meter=~39 inches. 1 kilometer (km)=1000 meters=~0.6 miles.
    1,000,000 microns=1 meter. 1,000 millimeters (mm)=1 meter.
    100 centimeters (cm)=1 meter.
  micron (μm) one millionth of a meter (0.000001 meter); also referred to as a micrometer.
  mil 1/1000 or 0.001 of an inch; 1 mil=25.4 microns.
  nanometer (nm) one billionth of a meter (0.000000001 meter).

UART Short for universal asynchronous receiver-transmitter. The UART is a computer component that handles asynchronous serial communication. Every computer contains a UART to manage the serial ports, and some internal modems have their own UART.

USB Short for "Universal Serial Bus". USB is a serial bus standard (standardized communications protocol) that enables data exchange between electronic devices. USB supports data transfer rates of up to 12 Mbps (megabits per second). A single USB port can be used to connect up to 127 peripheral devices, such as mice, modems, and keyboards. USB also supports plug-and-play installation and "hot plugging". USB is expected to completely replace serial and parallel ports. Hi-Speed USB (USB 2.0) similar to FireWire technology supports data rates up to 480 Mbps.
  A USB Flash Drive is a small, portable flash memory card that plugs into a computer's USB port and functions as a portable hard drive with up to 2 GB of storage capacity. USB flash drives are touted as being easy-to-use as they are small enough to be carried in a pocket and can plug into any computer with a USB drive. USB flash drives have less storage capacity than an external hard drive, but they are smaller and more durable because they do not contain any internal moving parts. USB flash drives also are called pen drives, key drives or simply USB drives.
  A USB flash memory drive is a portable storage device, which functions like a hard drive or a removable drive when inserted into the USB port of a PC. Primarily used to store, backup, download and transfer data from one computer to another. These USB key chain memory devices have replaced floppy disk drives in the market.
  A USB stick is any small, self-contained memory apparatus, for example approximately ½-1 inch in cross-section and approximately 2-3 inches in length, having a USB plug for plugging into the USB port of a computer, or other apparatus capable of interacting with the USB stick.
  A USB Token is a portable, hand-held key fob that is the size of a standard car key. It is embedded with a computer microchip that can store, access and process data. USB tokens have an operating system, temporary memory and non-volatile, "updateable" file/object storage memory, affording capabilities greater than those of traditional smart cards. They can generate secret cryptographic keys (Public & Private Key Infrastructure) and store private data (digital certificates, digital signatures, biometric identifiers, passwords, system settings etc).

UWB UWB is short for "Ultra Wide Band". UWB is a wireless communications technology that transmits data in short pulses which are spread out over a wide swath of spectrum. Because the technology does not use a single frequency, UWB enjoys several potential advantages over single-frequency transmissions. For one, it can transmit data in large bursts because data is moving on several channels at once. Another advantage is that it can share frequencies that are used by other applications because it transmits only for extremely short periods, which do not last long enough to cause interference with other signals.

VoIP Short for Voice over Internet Protocol. VoIP (also called IP Telephony, Internet telephony, and Digital Phone) is the routing of voice conversations over the Internet or any other IP-based network. The voice data flows over a general-purpose packet-switched network, instead of traditional dedicated, circuit-switched voice transmission lines.

WEP Short for Wired Equivalent Privacy, a security protocol for wireless local area networks (WLANs) defined in the 802.11b standard. WEP is designed to provide the same level of security as that of a wired LAN. LANs are inherently more secure than WLANs because LANs are somewhat protected by the physicalities of their structure, having some or all part of the network inside a building that can be protected from unauthorized access. WLANs, which are over radio waves, do not have the same physical structure and therefore are more vulnerable to tampering. WEP aims to provide security by encrypting data over radio waves so that it is protected as it is transmitted from one end point to another. However, it has been found that WEP is not as secure as once believed. WEP is used at the two lowest layers of the OSI model—the data link and physical layers; it therefore does not offer end-to-end security.

WiFi, Wireless LAN or IEEE 802.11 Short for wireless fidelity and is meant to be used generically when referring to any type of 802.11 network, whether 802.11b, 802.11a, dual band, etc. The term is promulgated by the Wi-Fi Alliance. Any products tested and approved as "Wi-Fi Certified" (a registered trademark) by the Wi-Fi Alliance are certified as interoperable with each other, even if they are from different manufacturers. A user with a "Wi-Fi Certified" product can use any brand of access point with any other brand of client hardware that also is certified. Typically, however, any Wi-Fi product using the same radio frequency (for example, 2.4 GHz for 802.11b or 11 g, 5 GHz for 802.11a) will work with any other, even if not "Wi-Fi Certified." Formerly, the term "Wi-Fi" was used only in place of the 2.4 GHz 802.11b standard, in the same way that "Ethernet" is used in place of IEEE 802.3. The Alliance expanded the generic use of the term in an attempt to stop confusion about wireless LAN interoperability. Wi-Fi is poor at real-time data, until 802.11e is deployed. It requires relatively high power, so unsuitable for small battery-powered applications.

Wireless USB It is based on WiMedia's ultra-wideband common radio platform, enabling products from the PC, CE and mobile industries to connect using a common interface at up to 480 Mbps at 3 meters and 110 Mbps at 10 meters.

WLAN Short for "wireless local-area network". Also referred to as LAWN. A WLAN is a type of local-area network that uses high-frequency radio waves rather than wires for communication between nodes (e.g., between PCs).

BRIEF DESCRIPTION (SUMMARY) OF THE INVENTION

An embodiment of the invention is generally directed to a compact personal RFID token apparatus, which can be plugged into a personal computer and interfaced with the virtual world of the Internet. The apparatus (or, as will be evident, a portion of a modular apparatus) can then be removed from the personal computer and used to conduct real world transactions. The compact personal token apparatus comprises a contactless and wireless interface. The "personal computer" can be any apparatus which is capable of interacting with the token apparatus (or the like), so long as the apparatus is a device capable of interacting with the software contained in the token apparatus (or the like).

An embodiment of the invention is generally directed to a compact personal RFID token and a compact RFID reader token with a slot or hatch to accommodate a transponder. The compact personal RFID token is a transponder device with multiple interfaces (mechanical, contactless, wireless and optical) and extended memory (flash or hard disk drive), which can be used in a plethora of applications such logical and physical access, secure identification, ticketing, payment and e-commerce. The compact personal RFID reader token is an RFID reader with similar interfaces as described above but with a slot allowing the user to insert a transponder device or contactless fob. The fob can also be a dual interface device with smart card contacts and contactless function. The primary difference between the compact personal RFID token and the RFID reader token is that the user can insert any contactless fob (e.g. payment fob) into the portable reader. This means that the user has flexibility in deciding which contactless fob should be used in a particular application and user can use the reader to check the status of his or her balance. In short, the reader and transponder is one single apparatus.

According to the invention, a compact personal RFID token apparatus comprises a connection module; a translation module; a processor module; and an input/output module. The connection module is for interfacing the device with an appliance capable of communicating and interacting with remote servers and networks. The translation module can move signals between a USB interface and a smart card interface, without being limited by smart card software architecture limitations. The smart card interface is selected from the group consisting of ISO 7816 (Contact Interface), ISO 14443 & ISO 15693 and NFC (Contactless Interface). The processor module is for controlling operation of the compact personal RFID token apparatus and is preferably capable of operating as a dual-interface (DI) chip. The input/output module comprises at least one RF antenna and a modulator. The apparatus may comprise flash memory. The processor module may comprise a dual interface (contact & contactless) chip; wherein the translation module moves data or signals from a USB interface to the contact interface (smart card protocol) of the processor module with storage of data in the flash memory or in an EEPROM of the processor module. The processor module may comprise a triple interface processor including contact (e.g. compliant SIM module (ISO 7816) for insertion into the apparatus), contactless and USB (connection module). The apparatus may be configured for transferring messages & data from the contactless to the wireless interface in active mode and to run contactless to wireless applications. The apparatus may be configured for interfacing with the Internet and emulating a smart card. The apparatus may be include a standard-compliant contactless interface and a wireless interface; wherein the contactless interface complies to one or more of the following standard interfaces: RFID-contactless interface according to ISO 14443 & ISO 15693 and NFC; and wherein the wireless interface comprises at least one of the interfaces selected from the group consisting of ZIGBEE wireless, BLUETOOTH wireless, WLAN 802.11, UWB, USB wireless and any similar interface. The connection, translation and processor modules enable the download of content or value data from the virtual world of the Internet to internal memory of the apparatus and the use of the content or value data in the real world via it's contactless RFID interface (output module) operating in a passive mode. The data stored in the personal token apparatus via the standard contact based interface (connection module) may be used for personal identification, secure network logon, access control, e-ticketing, e-payment and similar applications using either the standard compliant interface or the RFID-compliant interface. Data received through the RFID-interface can be stored in the memory of the personal RFID token apparatus and can then be provided to the host processing device via the standard interface, thus allowing a complete information exchange between the virtual world and the real world. The apparatus has an interface with an Internet-capable appliance; and the interface with the Internet-capable appliance is selected from the group consisting of ZIGBEE wireless, NFC, BLUETOOTH wireless, WLAN, UWB and wireless USB or optically via Infrared.

According to the invention, a compact personal RFID token apparatus comprises: a standard-compliant connection based interface, the connection based interface complying to at least one standard interface selected from the group consisting of USB, IEEE 1394, PCMCIA, Compact Flash, Multi Media, Memory Stick, Smart Media, Secure Digital, mini SD, IBM Micro Drive, and any similar standard interface.

According to the invention, a compact personal RFID reader apparatus comprises: a housing; a slot for a contact or contactless fob; and a USB stick alternately protruding from the housing and retracted within the housing. The USB stick may have an antenna and the housing may be metallized so that when the USB stick is retracted within the housing the antenna is shielded by the metallized housing. The apparatus may include a slot(s) or hatch(s) to accommodate the insertion of a contact or contactless fob, transponders in various formats, SIM module, removable SD, mini SD, MMC, RS-MMC, Intelligent Stick, Memory Stick or Compact Flash card. The apparatus may comprise a standard-compliant wireless & optical interface; wherein the wireless interface comprises at least one of the interfaces selected from the group consisting of ZIGBEE wireless, BLUETOOTH wireless, WLAN 802.11, UWB, USB wireless and any similar interface as well as an optical interface such as infrared.

According to the invention, a RFID token apparatus comprises: two or more internal USB devices; and a USB hub controller integrated into the apparatus for facilitating communication (enabling transmission of data) between the internal USB devices and a host computer into which the USB apparatus is plugged. The internal USB devices are selected from the group consisting of USB (NAND) flash memory device, USB hard disk drive (HDD), USB devices with RFID that can adopt the smart card protocol, USB smart card devices and USB wireless devices. The hub controller may be accompanied by a second micro controller for the purpose of accelerating an encryption/decryption process. The apparatus may include a Flash memory drive, WLAN & RF ID interfaces with parameters configured for in-flight computing and the MAC address of the contactless/wireless USB apparatus can be encrypted with debit—credit card details. The apparatus can generate a One Time Password when in an electromagnetic field or in a wireless hotspot. The apparatus uses a single chip multiple interface microcontroller with memory management capability, which communicates directly with a combination of block devices selected from the group consisting of non-volatile flash memory chip, hard disk drive, smart card device, RFID device with smart card protocol and wireless device.

According to the invention, an external, multiple interface RFID token with an integrated gatekeeper hub, comprises: two or more internal USB devices; and a USB hub controller integrated into the apparatus for facilitating communication (enabling transmission of data) between the internal USB devices and a host computer into which the USB apparatus is plugged; wherein the internal USB devices are selected from the group consisting of USB (NAND) flash memory device, USB hard disk drive (HDD), USB devices with RFID that can adopt the smart card protocol, USB smart card devices and USB wireless device. Hub management software for the various USB devices may reside in EEPROM, the flash memory or in the hard disk drive.

BRIEF DESCRIPTION OF THE DRAWINGS

The structure, operation, and advantages of the present preferred embodiment of the invention will become further apparent upon consideration of the descriptions set forth herein, taken in conjunction with the accompanying figures (FIGS.). The figures (FIGS.) are intended to be illustrative, not limiting. Although the invention is generally described in the context of these preferred embodiments, it should be understood that it is not intended to limit the spirit and scope of the invention to these particular embodiments.

DETAILED DISCLOSURE OF THE INVENTION

FIGS. 1A-1D illustrate an embodiment of the invention, which is generally directed to multi-interface compact personal RFID token apparatus and methods of use. A compact personal token apparatus, suitably resembling a conventional USB memory fob in size, shape, and form which can be plugged into a PC and interfaced with the virtual world of the Internet. The apparatus is capable of loading and storing information from the Internet, via the PC to its flash memory or EEPROM and then using the stored information or value via its contactless interface in passive mode or via its wireless interface in the real world. The apparatus is capable of implementing an auto-run application, when inserted into a personal computer. The apparatus is capable of exchanging information with other devices having compatible interfaces. The apparatus can also function as a firewall when plugged between an Internet connection and a PC.

Figure 1A:
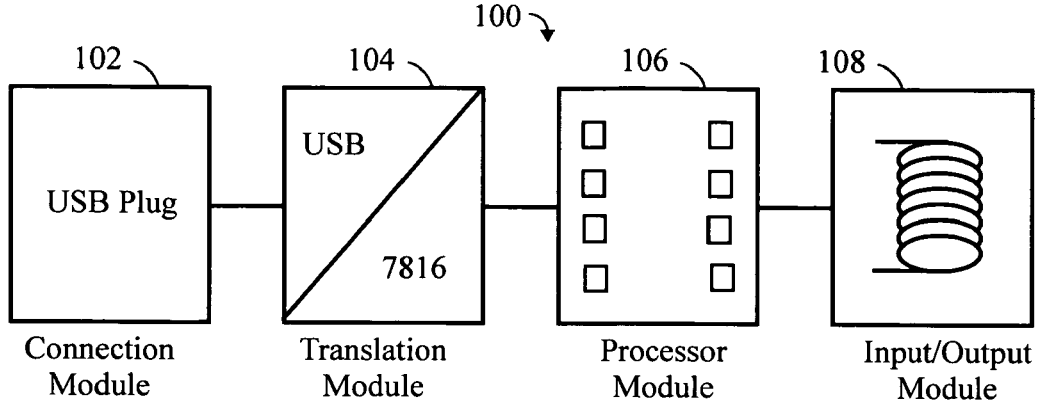
FIG. 1A (FIG. 1A of '296) is a block diagram of an embodiment of the invention.

FIG. 1A is a schematic block diagram of an exemplary embodiment 100 of the invention employing a dual interface (DI)—contact & contactless—chip and having four modules, all interconnected as shown to provide the contemplated functionality of the present invention. The major components, mounted on a circuit board (PCB, not shown) and within a housing (not shown) are (from left-to-right):

a connection module 102;
a translation module 104;
a processor module 106; and
an input/output (I/O) module 108.

The connection module 102 is for interfacing the device with a personal computer (not shown) apparatus, or other appliance capable of communicating and interacting with remote servers and networks. In the example of the compact personal token apparatus of the present invention, the connection module can be a USB plug, for plugging directly into a personal computer (PC). Other possibilities for connecting (communicating) with the personal computer are FireWire, standard serial port, IR, BLUETOOTH wireless, WLAN, etc., basically any suitable interface between an external memory/processing apparatus and a personal computer.

The connection module 102 is typically for inputting data to the device from the virtual world of the Internet, via the PC or other Internet capable appliance, and in some cases the device can or needs to also output data to the PC and/or to another entity via the Internet. The particular plug or connection interface which is used is whatever is available, either now or in the future. And the device is not limited to communicating with other entities via the "Internet", but can communicate via other networks or internets. These comments apply to other embodiments described herein.

The '296 technique is not limited to a particular form of interface/communication protocol. The point is that the device can interact with the virtual world via an Internet-capable appliance. One of ordinary skill in the art to which the invention most nearly pertains will recognize, and it is within the scope of the invention that other possibilities for what has been described as "devices capable of communicating and interacting with remote servers and networks" are PDAs, cell phones, etc., not only personal computers—basically, any (what is referred to elsewhere as) "host device" or "host processing device".

The translation module 104 is for going (moving signals) from USB (the exemplary interface with the computer) to a smart card interface format, such as ISO 7816, and vice-versa. The translation module may comprise a Philips TDA8030 USB/7816. (ISO 7816 is a smart card contact interface.)

A micro-controller such as an 8 bit micro-controller (ST7 FSCR1E4M1) can be used as an interface translator chip (104) between the USB connection 102 and the processor module 106. (The processor could be mounted in a SIM module.)

Figure 1B:
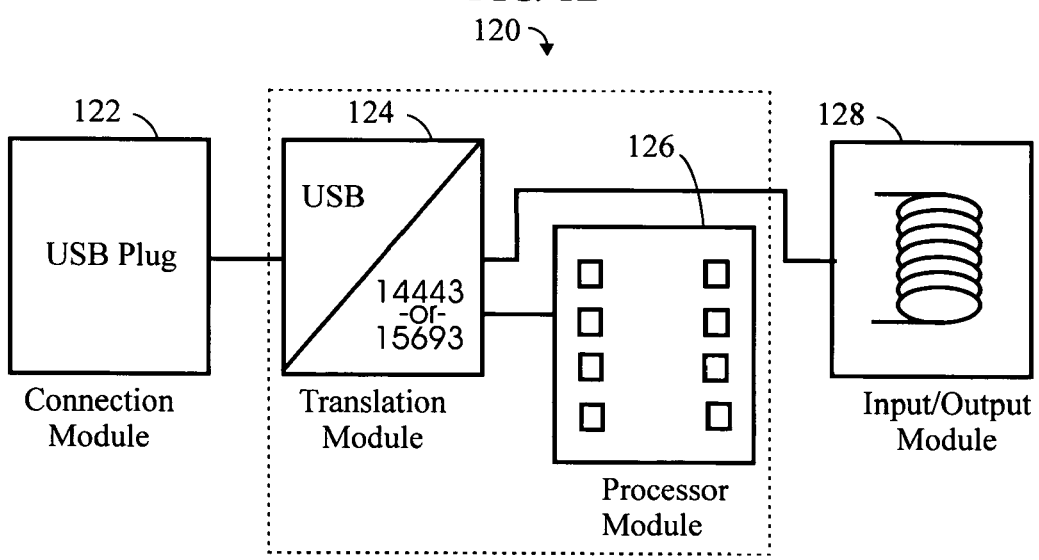
FIG. 1B (FIG. 1B of '296) is a block diagram of an embodiment of the invention.

Alternatively, the translation module can go from USB to ISO 14443 or 15693 (contactless interface). The latter is shown in FIG. 1B, and is described herein below. In going directly from USB to contactless, the device is not limited by the smart card software architecture (ISO 7816) limitations. The translation module in this case is a processor device that will handle the data processing from USB to contactless.

The processor module 106 is for controlling operation of the compact personal token apparatus ("device") of the present invention and is preferably capable of operating as a dual-interface (DI) chip. For example, Mifare ProX, Infineon 66 series, etc. The dual interface chip is available from various vendors (e.g., Philips, Infineon, ST Microelectronic), and is capable of interfacing from ISO 7816 (contact interface) to either or both of ISO 14443 and 15693 (contactless interface).

The output module 108 comprises an RF antenna and a modulator, etc. Alternatively, the output module comprises a set of contacts for contacting the pads on a smart card (see FIGS. 3A and 3B below).

In this as well as in other embodiments described in the '296 application, the module 108 is more than an "output" module sending data in only one direction, that rather it is a transceiver module adapted to transmit as well as receive data. The same can be said of the input module (e.g., 102 in that it facilitates two-way communication. It is only as a prosaic convenience that the modules 102 (e.g.) and 108 (e.g.) are labeled "input" and "output" respectively.

As mentioned above, alternatively, the translation module can go from USB to ISO 14443 or 15693. In other words, directly from USB to contactless.

FIG. 1B is a schematic block diagram of another exemplary embodiment 120 of the invention, also having four modules, all interconnected as shown to provide the contemplated functionality of the present invention. The major components, mounted on a circuit board (PCB, not shown) and within a housing (not shown) are (from left-to-right):

a connection module 122;
a translation module 124;
a processor module 126; and
an input/output (I/O) module 128.

As in the previous embodiment, the connection module 122 can comprise a USB plug or any suitable interface to a personal computer or other device (apparatus, appliance) capable of communicating and interacting with remote servers and networks.

As in the previous embodiment, the output module 128 can comprise an RF antenna and modulator, or alternatively a set of contacts for contacting the pads on a smart card.

Unlike the previous embodiment, in this embodiment the translation module 124 goes from USB to a contactless interface. Therefore, the processor module 126 does not need to be a dual interface (DI) chip. Rather, the processor module 126 could simply comprise a USB interface on one side and a contactless interface on the other. The memory of the processor could be used as temporary storage and the processor could handle the data encoding as well.

It is also within the scope of the invention that the processor module (e.g., 106 or 126) could include (incorporate) the translation module (e.g., 104 or 124) within the processor module itself, thus enabling an even more cost effective solution, enabling using a single chip approach for some, or even all of the embodiments discussed herein. (This is not explicitly shown, but one could envision, for example, simply merging the blocks 124 and 126 together, as indicated by the dashed line.)

Figure 1C:
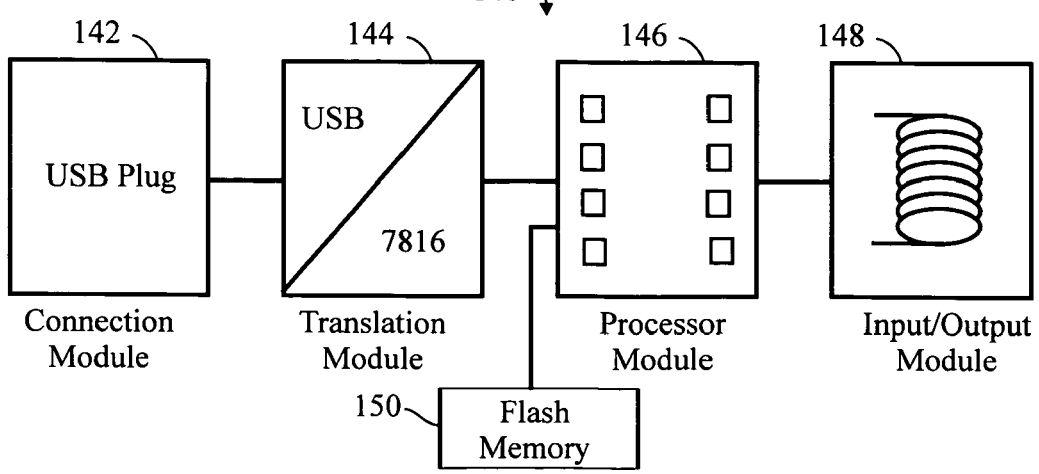
FIG. 1C (FIG. 1C of '296) is a block diagram of an embodiment of the invention.

FIG. 1C is a schematic block diagram of another exemplary embodiment 140 of the invention, based on the embodiment 100 of FIG. 1A. The major components are:

a connection module 142;
a translation module 144;
a processor module 146; and
an input/output (I/O) module 148.

In this embodiment 140, a flash memory device 150 can be included, with a storage capacity of 1 to 4 megabytes (or more) for the purpose of running applications. The memory management for the device may be handled by a crypto controller operating system with an 8 bit address bus in the dual interface (DI) chip. The flash memory device may be any suitable device including, but not limited to, Secure Digital (SD) card format, and including SIM card. (A crypto controller is a processor chip capable of encrypting and decrypting data to be stored in internal or external memory.)

The apparatus may incorporate firewall functionality to protect an Internet-capable appliance.

The invention may be embodied in the form of a "smart fob" apparatus, having the general physical configuration (size, shape, form) of a conventional USB memory fob. (Refer to FIG. 2A of the '296 application.) This is basically a device (200) having the elongate size and general shape of your finger, comprising a main body portion (210) housing the electronics (cf. 104, 106, 108) and a USB plug (212, 102) extending from an end of the body portion (210). A hole (214) may be provided for suspending the device (200) from a keychain (not shown).

As mentioned above, the "compact personal token apparatus" may be referred to herein as "smart fob" (without prejudice to any trademark rights which may be claimed). Now that its functionality has been described ("smart") and an exemplary physical form ("fob") has been described, the device will typically be referred to simply as the smart fob (without quotation marks).

Figure 2A:
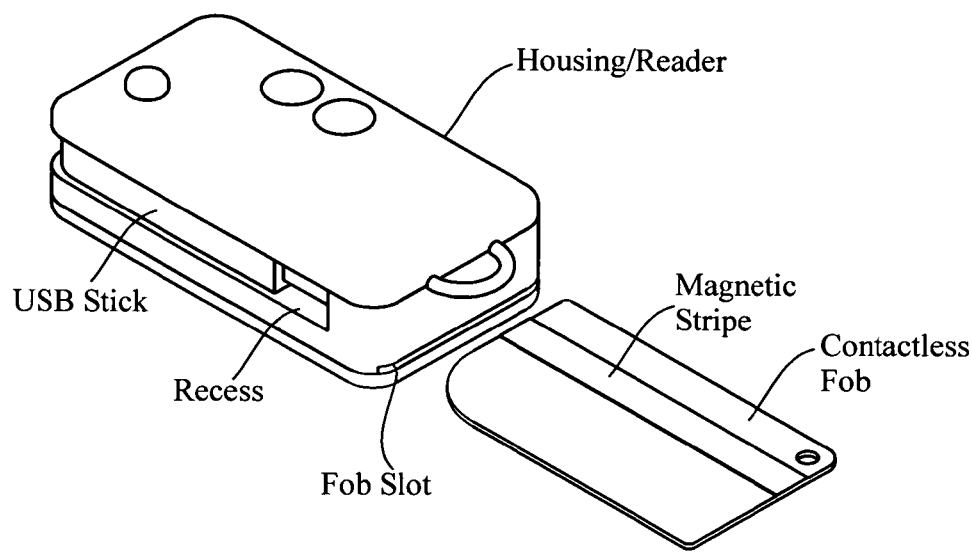
FIGS. 2A and 2B are perspective views of an embodiment of the invention.
Figure 2B:
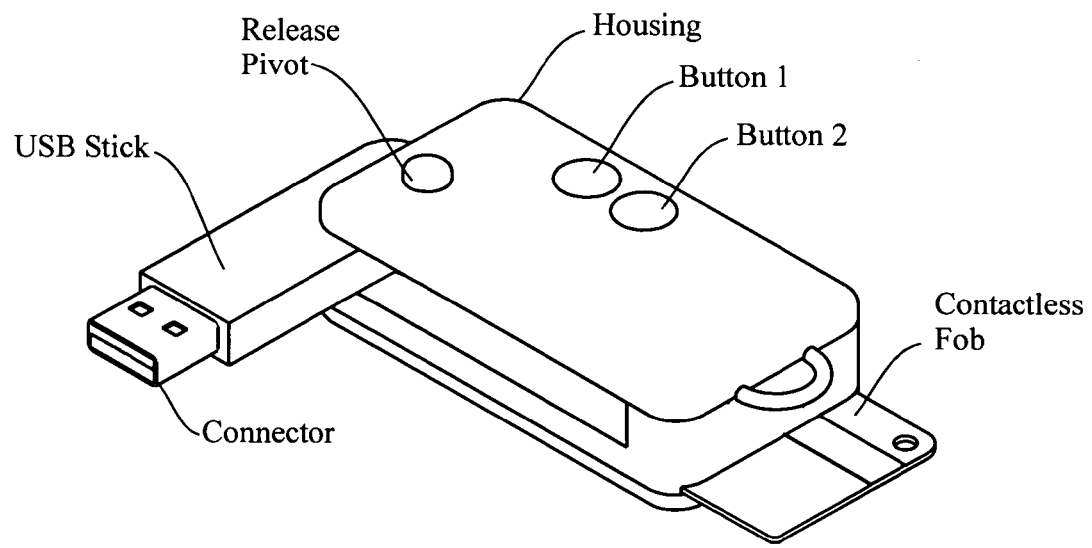

FIG. 2B of the '296 application illustrates another exemplary embodiment (220) of the smart fob, again in the general form of a USB memory fob. But in this case, the smart fob has a first physical module (222; left, as viewed), which contains the input module (e.g., 102, USB plug, cf. 212) and translation module (e.g., 104), and a second physical module (224; right, as viewed) which contains the processor module (e.g., 106, dual-interface chip) and output module (e.g., 108, RF antenna and modulator). The two modules (222 and 224) can plug together and be taken apart from one another. In this manner, after interacting with the "virtual world" on his computer, the user can separate the two modules (222 and 224) and carry just the second module, for conducting "real world" transactions. The second module (224), comprising processor and output module, is sufficient for conducting real world, contactless transactions, in the manner of a smart card. In other words, the smart fob can emulate a smart card.

Figure 3A:
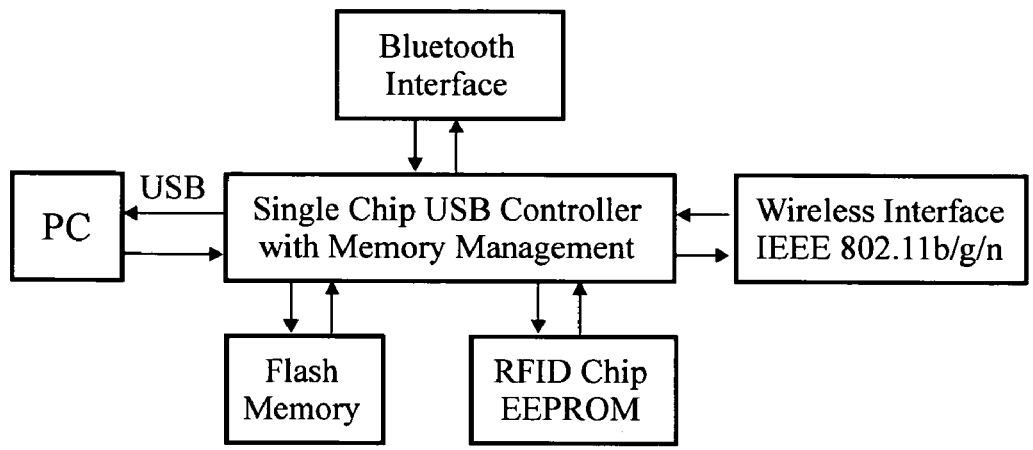
FIG. 3A is a block diagram of an embodiment of the invention.

FIG. 3A of the '296 application illustrates another exemplary embodiment of the invention wherein, rather than being intended to function as (emulate) a smart card, the output module (e.g., 108) of the compact personal token apparatus 300 is adapted to receive and communicate with a standard (including dual interface) ISO 7810 (7816) smart card (310). Instead of an RF antenna (and modulator), the fob (300) would have contacts for interfacing with the contact pads of the smart card (310).

Figure 3B:
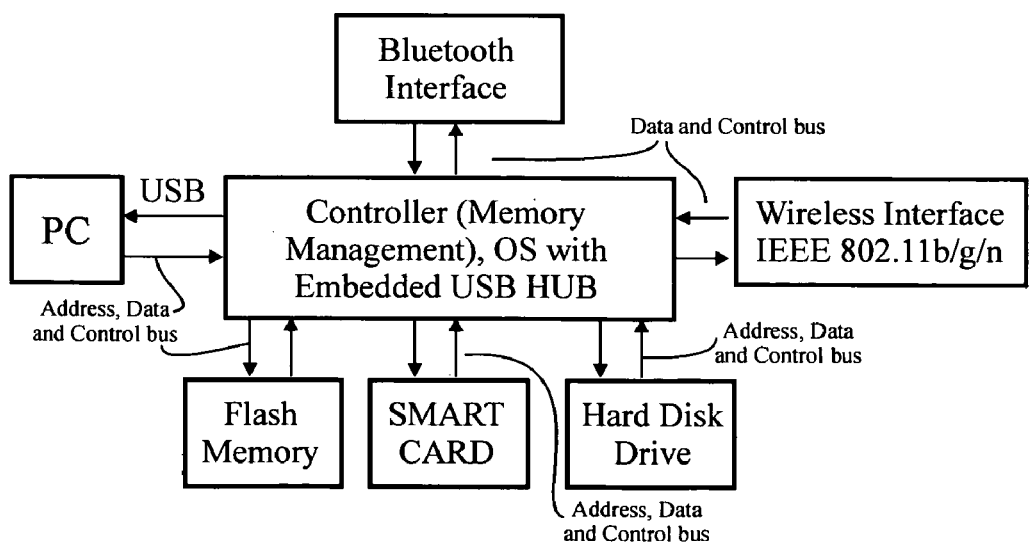
FIG. 3B is a block diagram of an embodiment of the invention.

The fob of this embodiment could be modularized, as shown in FIG. 3B of the '296 application, having a first physical module (322) comprising the input module (e.g., 102) and translation module (e.g., 104) and a second physical module (324) comprising the processor module (e.g., 106) and the output module (having contacts rather than antenna/modulator), although the purpose of modularization in this case would not be for carrying around, but rather for changing/updating components. Or, the FIG. 2A or 2B (of the '296 application) embodiments could be modified by just adding a contact reader slot for a smart card. In this case, the compact personal token apparatus functions as more than a reader, it is a transaction device.

Normally, the FIG. 3A/3B (of the '296 application) product would not require the DI chip (e.g., 106) and the RF interface (e.g., 108). However, if it does, when connected to a PC it could be used to load value stored on a smart card onto the smart fob, and then use that value in the real world. Now you have the ability to add value and information or exchange value and information between the fob and a conventional contact smart card.

Also if the FIG. 3A/3B (of the '296 application) product would contain the chip and the RF interface you could use it—when connected to a PC—to load value stored on a smart card and then use that value in the real world. This provides the ability to add value and information to the smart fob from smart cards as well as from the Internet. An example would be a cash transaction between two people—a person with a smart card could transfer the purchase amount of an item to the smart fob via the 7816 interface and the owner of the smart fob could take the smart fob to a fast food restaurant and use the stored value to buy lunch. In these cases, the FIG. 3A/3B embodiment is not simply a smart card reader.

Figure 1D:
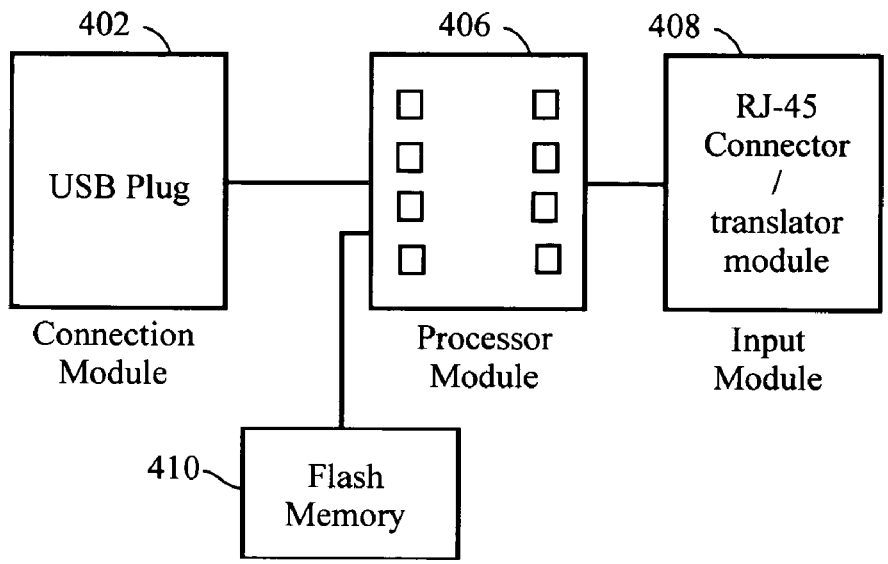
FIG. 1D (FIG. 4 of '296) is a block diagram of an embodiment of the invention.

FIG. 1D (FIG. 4 of the '296 application) is a schematic block diagram of an exemplary embodiment 400 of the invention wherein the device can be used as a firewall to protect, for example, a PC. The functionality is described elsewhere in greater detail. The principal components of the device 400 are:

a connection module 402 for plugging into the USB (or, network, LAN/Ethernet, or Fast Ethernet 10/100 MBit) port of a PC;

a processor module 406; and an input module 408 which, unlike other embodiments, need not perform contactless (or wireless) functions, but rather is socket (or plug), such as RJ-45, for connecting to a telephone line (or the like) supporting a DSL (or the like) connection to the Internet.

The device 400 may also incorporate flash memory 510 (compare 150).

Figure 1E:
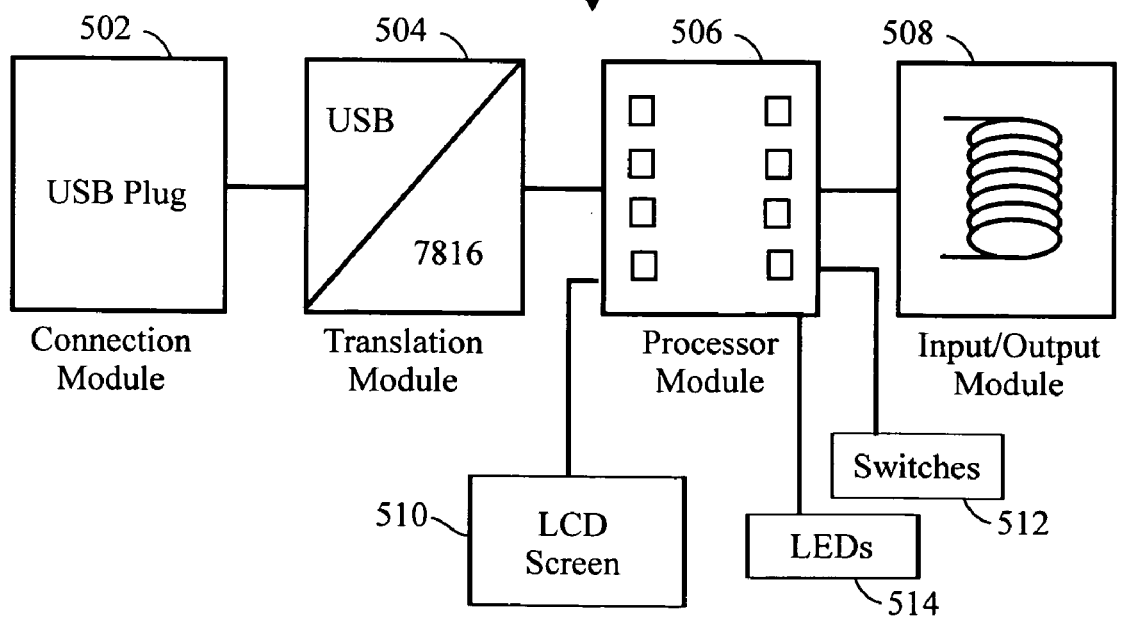
FIG. 1E (FIG. 5 of '296) is a block diagram of an embodiment of the invention.

FIG. 1E (FIG. 5 of the '296 application) is a schematic block diagram of an exemplary embodiment 500 of the invention, based on the embodiment 100 of FIG. 1. The major components are:

a connection module 502;
a translation module 504;
a processor module 506;
an input/output (I/O) module 508; and
an LCD display 510 for displaying messages regarding status or other relevant information to the user. It will be understood that a device having an LCD display should be "active", having its own battery (not shown).

Other input and output devices, such as switches 512 and LEDs (light-emitting diodes) 514, could readily be added to the device.

The invention is generally a compact personal token apparatus, which can be plugged into a personal computer and interfaced with the virtual world of the Internet. The apparatus (or, as will be evident, a portion of a modular apparatus) can then be removed from the personal computer and used to conduct real world transactions. The compact personal token apparatus is suitably in the general form of a fob, resembling a USB memory fob. The compact personal token apparatus comprises a contactless & wireless interface.

The invention is directed to an apparatus incorporating USB, RFID & WLAN interfaces as well as Mass Storage in a single device.

The term "wireless interface" generally (and frequently) refers to RFID (contactless) and Wireless (WLAN). Please note however, in the '296 application (and in this application) we primarily refer to the combination of contactless technology in passive mode and wireless technology being powered from a battery supply. In passive mode the apparatus draws its energy through inductive coupling from the electromagnetic field generated by a RFID reader. As is known, RFID (i.e. contactless) operates at 13.56 MHz, and Wireless (i.e. WLAN 802.11a/b/g) operates at 2.4 & 5.0 GHz. RFID operates at a maximum distance of 1 meter for pure identification and in a payment application, the distance is restricted to 10 cm.

As set forth in the specification of the '296 application, the apparatus can communicate either with the RFID—Contactless interface, Optical interface or with the Wireless Interface. The apparatus is constructed to have both. In a derivation of the apparatus, the apparatus also includes BLUETOOTH wireless (for private area network) which operates at the same frequency as WLAN 802.11 b/g, but in fact is an additional interface.

In summary, in the '296 application the RFID contactless interfaces are ISO 14443, 15693 and NFC, the wireless interfaces are ZIGBEE wireless, BLUETOOTH wireless, WLAN, and UWB and the mechanical interface is for example USB. The present invention has these interfaces. Additionally, the present invention has a shared memory between the interfaces, which can be EEPROM or NAND Flash Memory. The Smart Card interface is an internal configuration where the device of the invention translates USB to Smart card protocol.

The invention is generally a compact personal token apparatus which can be by means of standard-compliant interfaces (described herein below) connected to a personal computer and/or other internet capable devices such as; cell phones, personal digital assistants (PDA), digital media players, digital cameras etc. and interfaced with the virtual world of the Internet. The apparatus (or, as will be evident, a portion of a modular apparatus) can then be removed from the personal computer and used to conduct real world transactions. The compact personal token apparatus is suitably in the general form of a fob, resembling a USB memory fob. In some implementations it will take the general form factor required of the standard compliant interface such as SD and Mini SD cards, Multi Media Cards (MMC), PCMCIA Cards, etc. The compact personal token apparatus generally comprises a contactless & wireless interface.

Again (in the previous paragraph), the term "wireless interface" as used in the '296 application refers to RFID (contactless) and Wireless (WLAN), in the plural form.

A compact personal token apparatus comprises a connection module; a translation module; a processor module; and an input/output module. The connection module is for interfacing the personal token apparatus with an Internet-capable appliance; and the interface is selected from the group consisting of USB, FireWire, standard serial port, IR, BLUETOOTH wireless, WLAN. The Internet-capable appliance may comprise a device selected from the group consisting of personal computer (PC), laptop, PDA, MP3 player and cell phone. The translation module moves signals between a USB interface and a smart card interface. The smart card interface may be selected from the group consisting of ISO 7816, ISO 14443 and ISO 15693.

The previous paragraph specifies USB (mechanical interface), ZIGBEE wireless, BLUETOOTH wireless, WLAN & UWB (wireless interface) and ISO 14443 & ISO 15693 and NFC (contactless interface, or in generic terms "RFID").

The apparatus may further comprise a standard-compliant contactless/wireless interface; the contactless/wireless interface complying with one or more of the following standard interfaces: RFID-contactless interface according to ISO 14443 and ISO 15693 as well as similar interfaces, BLUETOOTH wireless compatible interface, WLAN 802.11, UWB, and any similar interface.

The previous paragraph expresses the contactless/wireless distinction better, and supports the comments made before about "wireless" including either contactless (e.g., RFID) or Wireless (e.g., WLAN).

The apparatus may further comprise a dual interface chip (processor) inside the personal token which can be directly programmed by a software running on the host system using the interface processor without the need for an external contact based dual interface read/write device. The software may be web based, allowing for downloading information from the web directly into the dual interface processor memory (for example, event tickets) thus linking the virtual world to the real world. The downloaded information may be used in the real world by using the contactless RFID interface.

The apparatus may further comprise a processor module; and additional memory selected from the group consisting of flash memory and EEPROM device powered and addressed by the processor module; wherein the additional memory can be used for user authentication and to run applications.

The apparatus may further comprise a triple interface (e.g., contact, contactless, USB) processor.

The "smart fob" is capable of loading and storing information from the Internet, via a PC or other Internet capable device to its memory and then using the stored information via its contactless or wireless interface in the real world. The "smart fob" is also capable of exchanging information with a conventional smart card.

An important point being made in the previous paragraph(s) is the concept of exchanging data from the memory. The techniques set forth herein (and in the '296 application) merge RFID with Wireless and incorporates Flash Memory for storage and auto run applications as well as incorporating diverse mechanical connection interfaces.

The apparatus set forth herein (and in the '296 application) may further comprise a standard-compliant contactless/wireless interface; the contactless/wireless interface complying to one or more of the following standard interfaces: RFID-contactless interface according to ISO 14443 & ISO 15693 and NFC as well as similar interfaces, ZIGBEE wireless, BLUETOOTH wireless compatible interface, WLAN 802.11, UWB, and any similar interface.

In its simplest form, the apparatus can be a simple USB memory stick. Or, it can incorporate several of the features and functions of the compact personal token apparatus which is set forth in the aforementioned '296 application which describes a compact personal token apparatus which can be plugged into a personal computer (PC) and interfaced with the virtual world of the Internet. The apparatus can then be removed from the PC and used to conduct real world transactions. The compact personal token apparatus is suitably in the general form of a fob, resembling a USB memory fob. The compact personal token apparatus comprises a contactless & wireless interface. The "compact personal token apparatus" is also referred to therein as "smart fob" (without prejudice to any trademark rights which may be claimed).

As noted in the '296 application, the apparatus may incorporate firewall functionality to protect an Internet-capable appliance. The apparatus may comprise interfaces for ISO contact, contactless, USB and DSL. The apparatus may comprise an LCD screen. The apparatus may comprise at least one switch. The apparatus may comprise at least one LED.

As noted in the '296 application, the apparatus may further comprise a standard-compliant contactless/wireless interface; the contactless/wireless interface complying to one or more of the following standard interfaces: RFID-contactless interface according to ISO 14443 & ISO 15693 and NFC as well as similar interfaces, ZIGBEE wireless, BLUETOOTH wireless compatible interface, WLAN 802.11, UWB, and any similar interface.

As noted in the '296 application, the USB device is capable of implementing an auto-run application, when inserted into a personal computer (PC) connected to the Internet, and information exchanged and stored can be accessed in the real world application via its contactless or wireless interface. The memory space required for the auto-run application can reside completely in the device or only partially in the device. Additional memory space to complete the application can be located on the server of the ISP, trusted third party or host server. The apparatus is also capable of exchanging information with other devices having compatible interfaces.

As noted in the '296 application, the memory space required for the auto-run application can reside completely in the device or only partially in the device. Additional memory space to complete the application can be located on the server of the ISP, trusted third party or host server. The apparatus is also capable of exchanging information with other devices having compatible interfaces.

Application software for auto-run can reside partially in the USB stick and partially at the trusted server or even at the host server. With respect to cryptography, the requisite "identity based encryption" for user authentication can also reside partially in the USB key and partially at the trusted server, in order to speed up the processing time.

Form Factor

The USB stick can be in the form of a commercially-available USB memory stick, complete with its own housing, except that these memory sticks usually come with a removable cover which protects the USB connector at the front end of the stick. The cover is not required, because the dispensing holder of the Ser. No. 11/295,685 application comprises a housing (casing), which protects the USB connector when the USB stick is retracted, and not in use.

Alternatively, the USB stick can be a "stripped down" version of a commercially-available USB memory stick, without its own housing, having just the electronics and minimal mechanical features to support the electronics.

Antenna

The compact personal token apparatus (or "smart fob") comprises a contactless & wireless interface. This requires an antenna. USB fobs do not normally come with their own antennas. A suitable length for an antenna for a smart fob incorporating smart card functionality is 1-10 cm. An antenna of significant length is desired. The housing may interfere with the performance of the antenna.

The present invention may include an antenna of significant length, such as approximately 5 cm, which is separate from the USB stick, but which is electrically connected to the electronic circuitry within the USB stick. (Alternatively, transformer coupling of the antenna to the circuitry of the USB stick is also possible.)

Hatch for a SIM Card

According to the invention, additional functionality may be incorporated into the USB stick by providing the housing with a hatch for inserting a SIM card. Connections to the circuitry within the USB stick can be made via the strap (ref Ser. No. 11/295,685, strap 130). The hatch would be located in the casing.

Firewall Capability, Plugs

The retractable USB stick can be plugged into a PC (or the like), between the telephone line (DSL connection to the Internet) and the PC, to act as a firewall. The front end of the USB stick can be provided with a RJ-45 connector rather than a USB connector, for plugging directly into the LAN (Ethernet) port on the PC. And, the back end of the housing for the USB stick can be provided with another RJ-45 connector so that the phone line can be plugged into the housing for the USB stick rather than into the PC.

Alternatively, the plugs at both ends of the USB stick (one on the stick per se, the other on the housing) can be RJ-11, for performing a firewall function for a regular analogue telephone line. With two RJ-11 plugs, the USB stick can be interposed between any phone line and any phone apparatus, for any desired purpose. For example, functioning as an answering machine. Or, recording and/or transmitting telephone conversations (where it is legal to do so).

In either case, the plug at the back end of the housing for the USB stick should also be protected from the environment.

Applications for Multiple Interface Tokens

The '296 application discussed the use of a USB apparatus with a combination of communication interfaces such as RFID, NFC, WLAN, BLUETOOTH wireless and Ultra Wide Band technology. The technical features of the device included a translator module, a dual interface controller and a NAND Flash memory.

Embodiments (some of which have already been disclosed in the '296 application) include, but are not limited to:

A single chip USB controller that can communicate with a standard low or high frequency transponder chip and a flash memory drive. The controller would manage the memory not only in the NAND flash memory chip, but also the RFID data in the EEPROM of the transponder chip. An advantage of this technique is that the controller would be independent of the smart card protocol and any RFID device could be used in the USB apparatus.

In setting up a virtual private network between the home/office PC from a remote location, a second micro controller can be incorporated in the USB apparatus for the purpose of accelerating the encryption/decryption process. This includes the use of "Identity Based Encryption" which uses Elliptic Curve Cryptography (ECC); the next generation of public key cryptographic technology for protecting sensitive information.

Auto-run applications (presentations, advertisements, web-link, etc) when the USB apparatus is inserted into a port of a PC have been discussed. Consider this example of the manner in which data may be downloaded. In a corporate environment, presentations and information must be downloaded quickly into a USB apparatus, moreover, a few days prior to an important training seminar or meeting. As most USB apparatus are manufactured and packaged in Asia, it would be time consuming to download the data to a single apparatus and repackage. The solution would be to download the data to the NAND Flash Drive via the RFID interface. However, for high data transmission rates, the RF interface could be used to provide power to the apparatus from the electromagnetic field and another interface would be used for data transfer, such as ZIGBEE wireless, NFC, BLUETOOTH wireless, etc.

In addition to having two controllers, one could have a secure authentication chip which could be inserted into the USB key fob at a personalization bureau. This is particularly interesting for online banking or e-commerce, where sensitive data is only downloaded to the fob, just before sending the device to the customer.

The device permits expanding the USB flash drive market beyond storage, allowing the user to launch applications on any PC. The general idea is to have a portable apparatus that captures the best elements of multiple devices; the digital convergence of data storage, physical and logical access and wireless communication.

Surfing the Web from an Airplane or in a Train

Recently, Lufthansa passengers on selected long-haul flights have had broad-band Internet access through wireless LAN technology on board the aircraft. The settings on the PC are the same as those for accessing any public hotspot on the ground. The passenger is required to pass through a Lufthansa portal (World Wide Web at lufthansa-flynet.com), before accessing the worldwide web or a company Intranet access via a Virtual Private Network (VPN).

To set up a WLAN card profile for the Lufthansa Flynet Portal the passenger is required to make the following modifications to their PC:

Step 1

Open your WLAN card's program by clicking on Start—Programs

Make sure your WLAN card is activated

Set up a new profile using a name you've selected, such as "FlyNet", and the following settings:

For the SSID (or network name or ESSID) enter "Connexion1"

Under Network Mode (or Network Type) select "Infrastructure" (not "Ad Hoc")

Deactivate the WEP encryption or just select the "disabled" setting

If you have the option of selecting a Network Security Type select "None"

Click "OK" to activate this profile

Step 2: Check Browser Settings

In Internet Explorer, open the menu Tools—Internet options and click on the register card labeled "Connections"

Activate the option "Select no connection"

Then click on the "LAN settings" button

Deactivate the following settings:

"Automatic search for settings"

"Use automatic configuration script"

"Use proxy server for LAN"

Click on "OK"

In the following steps, Lufthansa recommends you save the default number sequences (IP address, subnet mask, standard gateway) as a screen shot. To produce a screen shot, press the "Print" or "PRT" key on your keyboard and insert the page into a PowerPoint page. You will need these number sequences later to use the Internet or intranet in your network on the ground, as they do not automatically reappear. This is how you check the Internet protocol TCP/IP and make sure that the DHCP (Dynamic Host Configuration Protocol) is activated:

Step 3: Setting the Internet Protocol
  Click on Start on Control Panel—Network Connections
  Select WLAN card and click on the right-hand mouse button to activate it
  Double click—your WLAN connection
  In the dialog window that appears, check "Internet Protocol (TCP/IP)," mark it and click on "Properties"
  The following options should be marked:
    "Obtain an IP address automatically" and "Obtain DNS server address automatically"
    Click on "OK" and restart your laptop For the average executive, the abovementioned procedure is complicated, requiring a change to the PC parameters.

According to the invention, frequent travelers could purchase the USB apparatus with Flash memory drive, WLAN & RF ID interfaces and parameters prepared (configured) for in-flight computing.

The MAC address of the wireless USB apparatus could be encrypted with debit—credit card details.

By removing the USB apparatus from the port of the PC, the Internet connection is dis-enabled.

The user can have a prepaid account with Lufthansa for in-flight Internet access to cover online charges. Also, access to the lounges using the RFID interface.

Software such as VoIP—for example, Skype (World Wide Web at skype.com)—could be loaded onto the USB apparatus with wireless LAN and BLUETOOTH wireless interfaces. When the device is plugged into the passenger's PC, the connection to the Lufthansa portal is made immediately. Of course, the passenger can surf the net, but also can Skype out using the BLUETOOTH wireless headset.

Additionally:
  Frequent travelers could purchase the USB apparatus with Flash memory drive, WLAN & RF ID interfaces configured for in-flight computing
  The MAC address of the wireless USB apparatus could be encrypted with debit—credit card details
  By removing the USB apparatus from the port of the PC, the Internet connection is disenabled
  Having a prepaid account with Lufthansa for in-flight Internet access to cover online charges
  Access to the lounges using the RFID interface
  Executives of the future will not carry a PC with them on a plane, as the next generation of Airbus has a business center and it will also be possible to rent a PC on board the aircraft. The only device, they will carry is the USB key fob with all their credentials, privileges and business data.

Most wireless connections for free Internet access is automatic, but in the case of hot spot zones such as Airports, the Wi-Fi (802.11b standard) service is based on a subscription fee, login charge or charged on a per-minute basis. Refer to the services provided by T-mobile under the web site (World Wide Web at t-mobile.com/hotspot). This means locating the wireless network and manually switching network adapter settings, i.e. setting the SSID (or network identifier) to "t-mobile" in order to synchronize to the T-Mobile Hotspot network.

In the case of Lufthansa in-flight service, the manual changes to the configuration of the network card are significant.

Therefore, when the USB key fob has the network configuration for Lufthansa or T-Mobile built into the device, this would clearly be an advantage for non-tech-savvy users. Also, the user's internal PC Wi-Fi configuration would not need to be altered.

For billing purposes, the dedicated corporate USB key fob with wireless and contactless interfaces would provide the frequent traveler with a simple to use convenient tool. As mentioned, the credit card details could also be encrypted into the MAC address or stored in a secure manner in the device.

The chip set for this multi-purpose device could include a USB micro controller (with public & secret key encryption) for NAND flash memory management and communication with peripheral devices such as Wi-Fi, BLUETOOTH wireless and RFID chips. A second chip may be used for cryptographic algorithms for payment and another controller may be used for authentication acceleration.

With the auto-phone application as described above, for in-flight Internet access, it is apparent that the multi-interface USB key fob is a very useful product. For example, the Skype software could reside as an auto-run application in the key fob and when the user inserts the device into the port of a laptop or any pocket PC, VoIP is possible. Whereby, the Wi-Fi interface communicates with the wireless local area network in the plane, which in turn communicates with a satellite, and the BLUETOOTH wireless interface is used to communicate with a BLUETOOTH wireless enabled headset.

Other Applications:
  Having an arrangement with a games software company, in which a reduced version of a popular game is downloaded in compressed format to the apparatus.
  Mail order catalogues would be sent as a USB device and online purchases would be made simple.
  Infra Red is another communication interface, which may be incorporated.

Technical Features
  As previously noted, the controller can directly communicate with a peripheral device such as an RFID chip (transponder). This of course, would be an electrical hardwire connection to the transponder.

In another embodiment of the invention—"RFID Reader Token, Memory & Multiple Interfaces"—the controller could be connected to an RFID reader chip with an antenna and enclosed within the housing of the USB apparatus. In short, the reader chip and antenna (or antennae) would be on the same motherboard as the controller, NAND flash memory and other peripheral devices.

The USB apparatus in the form of a RFID Reader Token can emulate Multiple ISO Standard Protocols (Mifare, ISO 14443, ISO 15693, etc) by storing the communication protocols and the modulation type of each transponder type in the NAND Flash memory or in any other non-erasable memory form. This concept of emulating the RFID protocols is called RFID agnostic.

RFID Agnostic
  Multiple ISO Standard Protocols (Mifare, ISO 14443, ISO 15693, etc) can be stored or masked to memory, making the apparatus RFID agnostic (any standard communication interface) for use in a combination of applications such as physical & logical access as well as payment.

As the apparatus accommodates different contactless specifications, it allows the issuers of the device to promote their own brands without duplicating the back-end systems To iterate on the function of this configuration, the RFID reader could draw its energy either from an electromagnetic field generated by an external reader or when the apparatus is inserted into a USB port of a PC. Alternatively, the RFID reader token could be powered by a battery.

Data Transfer to the NAND Flash Memory of a Transponder Token

Data can be downloaded to the NAND Flash memory via the RFID interface or for high data transmission rates, the RF interface can be used to provide inductive power to the apparatus from the electromagnetic field and another interface can be used for the data transfer, such as ZIGBEE wireless, NFC, BLUETOOTH wireless, etc.

Retractable USB Stick ("Ser. No. 11/295,685")

Copending patent application Ser. No. 11/295,685 filed Dec. 6, 2005 ("Ser. No. 11/295,685"), incorporated in its entirety by reference herein, discloses Retractable USB Stick. A retractable USB stick comprises: an elongate housing having an open end, a USB stick disposed within the elongate housing, and means for causing the USB stick to project out of and retract back into the housing. The means for causing the USB stick to project may be patterned after comparable means in a lipstick dispenser mechanism of U.S. Pat. No. 3,941,489. The means for causing the USB stick to project/retract may comprise an outer holder having an elongate housing with an opening at one end, an intermediate sleeve sized disposed between the USB stick and the holder, and means for imparting reverse motion includes a toothed wheel disposed at a back end of the intermediate sleeve, teeth on an inner surface of the outer holder and teeth on an elongate linear track extending from the back end of the USB stick. Optionally, the USB stick may be releasably locked in the open position, and means may be provided for closing the open end of the housing. An antenna can be incorporated into the retractable mechanism and/or housing.

The Ser. No. 11/295,685 application generally discloses a retractable USB stick comprising: an elongate housing having an open end; a USB stick disposed within the elongate housing; and means for causing the USB stick to project at least partially, out of the open end of the housing in an open position. The USB stick may project substantially fully out of the housing. The USB stick should project sufficiently out of the housing so that a USB connector at an end of the USB stick is adequately exposed for plugging into a personal computer. An antenna may be incorporated. Means may be provided for releasably locking the USB stick in the open position. Means may be provided for closing the open end of the housing. The means for causing the USB stick to project may be patterned after comparable means in a lipstick dispenser mechanism of U.S. Pat. No. 3,941,489, incorporated by reference herein. The means for causing the USB stick to project at least partially out of the open end of the housing may comprise: an outer holder comprising an elongate housing with an opening at one end; an intermediate sleeve sized disposed between the USB stick and the holder; and means for imparting reverse motion such that moving the outer housing relative to the intermediate sleeve causes the USB stick to extend from and retract into the intermediate sleeve. The means for imparting reverse motion may comprise: a toothed wheel disposed at a back end of the intermediate sleeve; teeth on an inner surface of the outer holder; and teeth on an elongate linear track extending from the back end of the USB stick. The housing could be of metal or metallized plastic which would attenuate a radio frequency signal.

Various embodiments of a retractable USB stick are disclosed in the Ser. No. 11/295,685 application. For example, in one embodiment, the closed position (FIG. 1A), the USB stick 110 is completely enclosed within the housing 120, except that the housing has an opening 124 in its front end. In the open position, the USB stick 110 extends through the opening 124, and is substantially fully exposed external of the housing 122, ready to be plugged into the USB port of a host device (such as personal computer).

As noted in the Ser. No. 11/295,685 application, wireless LAN operates at ultra high frequency around 2.4 GHz & 5.0 GHz, which requires a strip of wire as an antenna which could be integrated into the plastic finger piece. RFID operates at the high frequency of 13.56 MHz, which means that an antenna with a few turns would need to be incorporated into the finger piece. The antenna wire could be ultrasonically embedded into the finger piece. Of course, if the housing is plastic the antenna for both frequencies can be etched onto the perimeter rim of the PCB board in the USB stick. At ultra high frequency, again a very short metal track (strip) of about 5 cm is required. For the high frequency antenna, the track goes around the PCB board several times (about 4 times).

FIGS. 2, 2A, 2B and 2C of the Ser. No. 11/295,685 application illustrate another embodiment of the retractable USB stick wherein the USB stick is completely enclosed within the housing in a "closed" position. In the FIG. 1 and FIG. 2 embodiments of the Ser. No. 11/295,685 application, in the closed position, the USB stick is completely within the housing.

RFID Reader Token with Contactless Fob Slot & Multiple Interfaces

The reader chip would communicate at short distance with a transponder in contactless mode. The transponder could be inserted into the apparatus, in the form of a contactless SIM module, card, fob, tag or a glass tube. Equally, the transponder could slide into a pocket on the external wall of the apparatus housing. The card or fob can also be a dual interface device with two types of communication; smart card contacts (mechanical interface) and contactless (RFID).

The RFID reader can also have a display (not shown in FIGS. 2A and 2B).

In a practical example, the Express pay fob from American Express could fit into the external pocket. From the home PC, e-cash could be loaded onto the Express pay fob from the Internet banking system via the USB port to the reader chip and then in contactless mode to the transponder fob. Security features could reside not only in the EEPROM of the transponder, but also in the NAND Flash memory. (World Wide Web at americanexpress.com/expresspay/)

At the retail store the consumer would wave their newly loaded fob to make payments.

Insertable Transponder Fob in the Housing of a RFID Reader (FIGS. 2A, 2B)

FIG. 2A and FIG. 2B illustrate a RFID reader token housing a USB stick and having a slot for a contactless fob, in the closed (fob out) and open (fob in) positions, respectively. The reader token has extended memory (Flash or Hard Disk Drive) and multiple interfaces (ZIGBEE wireless, NFC, BLUETOOTH wireless, Wi-Fi, UWB, USB wireless, IR).

A payment fob can be inserted into a pocket or slot of a multiple interface RFID reader token, allowing the user to download value from an Internet banking system via the reader to the fob. Because of the portability of the multiple interface apparatus the user can leave the fob in the reader token and engage in a contactless transaction by simply waving the apparatus at a stationary RFID reader at the check-out in a grocery store, or for example at a vending machine or ATM. This method of bringing together or marrying the contactless transponder fob with the miniature portable reader token in application, allows the apparatus to both send and receive data as well as power up the contactless fob. The reader can read either a contactless fob (shown) or a contact fob (not shown).

This form of coupling between the internal reader chip, transponder and external reader opens up new doors in logical and physical access. Fingerprint templates, authentication data, encryption software, etc. do not need to reside in the EEPROM of the transponder. Also, security features could be shared between the memory in the transponder and the flash memory.

The apparatus could have a LCD display (not shown) to indicate time and remaining memory space. Of course, the display could also show the remaining amount in the fob and details of previous transactions.

Additional interfaces include NFC (contactless), ZIGBEE wireless, BLUETOOTH wireless, WiFi & UWB (wireless) and Infrared (optical). Extended memory can be flash (NOR or NAND) and/or hard disk drive.

The RFID reader token can have multiple antennae. For example, one antenna can be used to couple with the antenna in the contactless fob and to communicate (read/write messages) at very close range, whereby no external reader could listen to the exchange of data. On the other hand, a second antenna located for example in the USB stick could be used to draw energy from the electromagnetic field generated by the external reader and used to power up the RFID reader token in passive mode. This would mean that unless the USB stick was released from its recess position (within a metallized housing), no communications with an external reader would be possible, thereby preventing unauthorized access to the data stored in the EEPROM of the contactless fob or in the flash memory and/or hard disk drive of the RFID reader token. In active mode, the RFID reader can use its wireless (separate antenna) or optical interface to transmit data at short range. In this case, the user can activate a button (switch) to authorize or prevent a transaction. A display, not shown in the drawing, can also be incorporated into the apparatus.

It should be highlighted that the contactless fob is by way of example, the fob however could be replace with any type of transponder in various formats such as a glass tube transponder for an immobilizer application, a RFID chip module with etched antenna for identification & authentication in an access control application or a contactless SIM module storing value for a micro-payment application.

The USB stick functions primarily as a connector for interfacing the device with a PC (Internet capable appliance), and need not have its own internal memory, and may comprise an antenna. The reader token housing may be metallized, so that in the closed position, with the USB stick (and antenna) retracted (closed position) within the housing, the antenna is shielded and privacy can be ensured. When the USB stick is protruding from the housing of the reader token, the antenna within the USB stick is no longer shielded. The metal housing can act as a radio shield to avoid unauthorized transactions (anti-skimming) when the fob is closed.

Memory Management Controller

Most USB flash memory devices use a memory management controller from the Taiwanese company OTI or Phison Electronics. An operational description can be found under the web site (World Wide Web at oti.com.tw) and (World Wide Web at phison.com).

Basically, the flash disk controller from OTI connects directly to a USB port and performs the function of memory management through its flash drive interface.

Therefore, by modifying such a controller or processor to communicate with an additional peripheral device such as an RFID chip, a multiple interface USB key fob could be accomplished.

The benefit of such a design is that any low (125 KHz), high (13.56 MHz) or ultra high frequency RFID chip could be used. Also, one would not be restricted by smart card standards. Indeed, the RFID chip could be in the form of a SIM card, which could be inserted into a recess or hatch in the USB key fob.

In addition, to a controller for managing the peripheral devices, one could also have a second controller for accelerated computation of encrypted data, especially for remote access to an enterprise network. The benefit, here is the enhanced transmission speed in a virtual private network. The company "Cavium" has developed IPSec accelerator chips for the telecommunications industry (World Wide Web at cavium.com).

A useful embodiment of the USB key fob is a product with the following features:
  NAND flash memory for mass storage of data or programs
  Emulation of auto-run applications
  RFID interface with EEPROM which can be access from the controller for physical access control
  Encryption software for remote logical network access (User authentication)
  On-board firewall protection (Anti-virus software) or browser
  Rear connector for additional functions In addition, the USB key fob could also have GPS function, NFC, WLAN, BLUETOOTH wireless, Ultra Wide Band and infra-red interfaces.

Auto-Run Applications

Auto-run applications residing in the flash memory of the USB key fob include applications such as:

1. Securely storing on the USB device a user's account login and password for instant login to their e-mail account or online bank account without having to key in their login ID and password. The device could store credit card details and triple DES encryption with two-factor authentication providing the secure transfer of data.

2. The USB device could also be used to deliver customized promotional messages directly to the customer for the purpose of promoting a brand, website or sales information. By just inserting the device into a computer, the promotional media would start up automatically. The auto media application could support many media formats such as movies, PowerPoint, Word, Excel, pictures, sound, web pages, etc. Automatic login to the customer's website for online purchases or information could be feasible.

3. The USB key fob could also be used as a remote email management device to download emails and read them offline on any PC. In addition, set-up or login details to the user's email account could be stored on the device.

4. A personalized desktop set-up could also be customized on the device, for example to launch a program, to search on the Internet, to see a calendar, as a meeting reminder or to view real-time news. Favorite folders could also be stored on the device and synchronized automatically with the user's computer.

5. The auto phone application could allow a user to make affordable VoIP phone calls. The service provider's software would reside on the device and automatic login would be achieved by inserting the USB key fob into an Internet connected PC. The USB key fob could also have rear connections for microphone and headset. PC to PC calls and PC to phone would be standard. Such as a VoIP key fob with I/O port for a mini RCA jack for the headset. Additionally, BLUETOOTH wireless could be added to the fob to use a BLUETOOTH wireless headset. Additionally, a USB socket can be incorporated into the fob for connection to a USB headset. For embodiments with headset capability, sound card functionality can be incorporated into the fob.

There is a USB key fob on the market, from the company Migo, which stores, secures and synchronizes the user's documents, computing profile, Outlook email, and Internet Explorer favorites and makes them available on any other PC. (World Wide Web at 4migo.com)

Auto-Run Nuances

An auto-run application operates like a CD ROM. Upon insertion of the USB key fob into any PC, the user will typically be confronted with the application. For this reason, it is recommended that the USB key fob have a mechanical switch to select either auto-run or data storage function.

PCs can interpret differently an auto-run depending on the operating system, resulting in non-function of the application. To overcome this, driver software can be installed onto the PC when the auto-run application is first initiated. After the installation of the driver software, the user can select (soft-switch) on the PC screen either the memory storage or the auto-run icon.

File Sharing

The USB key fob could be used as a media for bartering (trading) or for exchange. The company Groove Networks has developed software that allows you to share files. (World Wide Web at groove.net)

Peer to Peer (P2P) Services

These are evolving, from their roots as public networks for often illicit purposes, into private and secure services for business. With pure P2P, data passes directly between end-user machines, or peers; it never passes through a central server.

P2P is a way of sharing files, but that's just part of it. P2P also offers all sorts of other collaboration tools, including chat clients, whiteboards, discussion forums and calendars.

The concept of having two USB key fobs has been discussed, but in the P2P concept, all participants that wanted to interconnect would have to have a fob for authentication and logical access. It could be used in business, to create a virtual workplace where multiple people can generate a central pool of data that any of them could access—and change at any time.

The fob would encrypt the data as it moves from machine to machine and in addition no one could see what you were sharing, if they had not been invited to the private group.

Online Games

Games are a fascination for children & teenagers and in particular for young male adults. Children, for example, not only play the games but also collect magic cards (collectable items) of their favorite characters (at a cost per card) and exchange them for other cards with friends. Online gaming features can be incorporated into the fob functionality.

Players identify themselves with the characters in the game and try to improve their characteristics and personality by buying or trading attributes. The number of attributes can be as many as 12 and some characters can have the ability to perform magic.

Games united people, to collaborate and to compete with and against each other in a community. Online Network Games allows people to play games against each other over the virtual world of the Internet. The service providers of such mass multiple player games earn from a monthly license fee and per game charge. VoIP allows the players to communicate with each other during a game. For example, players in Ireland could play a virtual game of golf with another team in a totally different country. (refer to xboxaddict.com/news/view.php?News_ID=4024)

On-Demand-Software or Sometimes Referred to as Paper-Use

This type of business model refers to renting software when only it is needed. To expand on this idea, adult games could be rented, whereby the position of the last game and the remaining credit amount (prepayment) in the account could reside on the USB key fob. For people on the move, continuation of the game could be started from any Internet connected PC (Internet Café).

E-Tickets Require a Boarding Card

The check-in kiosk in the departure area of many airports issues boarding tickets for passengers, who have booked tickets online. The airline booking confirmation number which is usually sent by email could reside on the USB Key fob, whereby the number would be downloaded to USB key fob during the online purchase ticket process. When passengers enter the airport, all they would need to do, is to wave the key fob in front of a kiosk and a boarding ticket would be issued.

Browser

Microsoft's Internet Explorer (IE) browser is used by about 90 percent of those who use the Internet at work. However, IE is now being challenged by Mozilla's new Firefox browser, an independent successor to the Netscape Navigation browser.

Firefox Advantages are as Follows:
Pop-up Blocking: Stop annoying pop-up ads in their tracks with Firefox built in pop-up blocker.
Tabbed Browsing: View more than one Web page in a single window.
Privacy and Security: Offers a comprehensive set of privacy tools unavailable in IE.
Smart Search: Google search is built right into the toolbar, and there is a plethora of other search tools including Smart Keywords
Live Bookmarks
Hassle-Free Downloading In short, the interface improvements include tabbed browsing and integrated search bars, reducing junk e-mail and protecting you from viruses. The e-mail client from the Mozilla foundation is dubbed Thunderbird and the program is a companion to Firefox open-source browser.

Additional Technical Features for the USB Fob
Partitioning the NAND flash memory, whereby one zone could be a secure area requiring a password to enter. In addition, the partition could be adjustable.
Security features could be embedded into the NAND flash memory. Alternatively, for data protection a vault like combination of a tamperproof built-in security chip and sophisticated data encryption software could be integrated into the device
An LCD to indicate the time (synchronized with the computer) and the memory space remaining in the flash drive
Analogue dual clock for frequent travelers, and a compass.
A pen (ball point cartridge), and a light
Metal support for printer circuit board (USB plug)
USB key fob in the form of a watch There are many suppliers of watches with on board flash memory or MP3 player. However, the idea of a watch with multiple interfaces, especially BLUETOOTH wireless or wireless to transfer data from the watch to a computer is believed to be new. The chargeable battery to power the BLUE- TOOTH wireless or wireless function could be recharged via the USB port of a PC. This concept would also be valid for a MP3 player in the form of a watch.

As mentioned above, the encryption computation can advantageously reside partly on the fob and partly on an external server for user authentication. However, with the advancement of chip technology, it is expected that the complete encryption/decryption could be performed by the fob.

In the above low power application, the wireless transfer of data can be achieved using a ZIGBEE wireless interface.

FIGS. 1A, 1B, 1C, 1D, 1E (FIGS. 1A, 1B, 1C, 4, 5 of the '296 application) illustrate various architectures for a number of embodiments, each of which showed some kind of translation module (e.g., 104, 124, 144, 504) separate from the processor module (e.g., 106, 126, 146, 506). The purpose of the translation module is, for example, for going (moving signals) from USB (the exemplary interface with the computer) to a smart card interface format, such as ISO 7816, and vice-versa. The translation module may comprise a Philips TDA8030 USB/7816. (ISO 7816 is a smart card contact interface.) It is within the scope of the invention that the translation module can be eliminated, going directly from USB to the processor, using conventional USB interface, and that any necessary transcoding takes place in the processor.

Transferring Stored Value

Valista: Software provider for telcos (telephone companies) in executing a billing process. Currently, Valista is selling minutes to mobile telephone consumers in the Philippines and the minutes (monetary value) can be easily transferred to another mobile telephone user. Using comparable technology and the USB fob, the recipient can cash out the minutes for cash at a local grocery store. (World Wide Web at valista.com)

Adapter for a Mobile Telephone, PDA etc

Some handsets, communicators and PDAs have a mini USB connection input, but the standard mobile telephone does not have such connection. For this reason, it is envisaged that a connector harness from the telephone to the USB key fob could have many advantages, especially in payment or additional data storage applications.

Other Applications

Having an arrangement with a games software company, in which a reduced version of a popular game is downloaded in compressed format to the apparatus.

Mail order catalogues could be sent as a USB device and online purchases would be made simple.

Buy, Sell and trade gift cards. The general idea is to have a portal for exchanging gift cards into cash or swapping them for a card issued by a favorite store.

Interfaces

The controller in the USB apparatus is a USB client to bus interface controller with sufficient RAM to manage the flash memory and other peripheral devices. It can support multiple transfer interfaces, namely:

USB Interface
Smart Card Interface (ISO/IEC 7816 Contact Interface)
Contactless RF Interface
IDE Device Interface
ATA-IDE Interface
I2C Device Interface
And standard parallel & serial data interface bus.

USB Devices with Integrated USB Hub

This embodiment is directed to USB devices (such as flash memory; HDD; RFID) with integrated USB hub. The multiple interface token incorporates a USB controller, which is independent of the smart card protocol and capable of managing the memory in a flash drive and the RFID data in a transponder chip. The multiple interface token can also incorporate an encryption/decryption accelerator chip to speed up the authentication or Identity Based Encryption process. The RFID or NFC interfaces can be used to download content in contactless mode to the flash memory, whereby the electromagnetic field can be used to power up the token. For high data rates, the RF interface could be used to provide power to the apparatus from the electromagnetic field and another interface would be used for data transfer. The multiple interface token with Flash memory drive, WLAN & RFID interfaces can be configured for in-flight computing, to simplify Internet access for the frequent traveler. The MAC address of the token can be encrypted with debit/credit card details for the purpose of paying for such services from the airline. The multiple interface token with RFID reader can communicate with an external transponder. The transponder payment fob could fit into the external pocket of the RFID reader fob (See FIG. 2A).

The apparatus described in the '296 application comprises a USB token incorporating a translator module, a dual interface (contact & contactless) processor with radio frequency and wireless communication. The translator module interfaces an ISO 7816 compliant contact smart card with a USB port, for the purpose of emulating smart card operations in a PC environment. Data is transmitted either in contact mode via the translator module to the USB port of a host computer or in contactless mode to an RFID (Radio Frequency Identification) reader.

The physical form factor of the smart card can, for example, be a SIM card, typically with 8 pins carrying power, data I/O, clock & reset signals and antenna connections. For contactless transmission, the antenna (with tuning circuitry) can be exterior to the SIM card on the perimeter of the internal printed circuit board, in order to capture sufficient magnetic flux from the electromagnetic field generated by the RFID reader. A plurality of methods may be used to embed the antenna in the apparatus.

In an extension of the invention, the translator module and dual interface processor are replaced by a single chip solution with USB, contact and contactless interfaces. In building on the modular configuration of the apparatus, a separate flash memory drive with memory management controller is incorporated in the apparatus, to store information and run applications.

In a further embodiment of the apparatus a multi-interface USB controller is used to manage the memory of the NAND flash storage drive and to communicate with several internal peripheral devices such as a RFID chip (reader/transponder), a cryptographic smart card chip and wireless devices.

However in the latter case, the command set typically used in memory management controllers is proprietary, and no communication standard exists in the industry. Firmware development at controller level is restricted to the use of a limited number of specific library cells. Minor modifications to the standard controllers are typically achieved through a metal mask change in the final manufacturing stage of the silicon wafer process. But in essence, there is no real standard platform to develop applications beyond storage.

The alternative solution, to develop embedded system software (programming code at the application, operating system & BIOS layers) for a unique multi-interface controller can be expensive and time to market after many development iterations can be long.

Therefore, the objective to converge mass storage, smart card technology, radio frequency identification and wireless communication in a single device is currently not feasible.

According to the invention, generally, alternative hardware architecture is implemented, which avails of a USB hub or cascade concept within the embodiment of the apparatus.

Various embodiments of the present invention are now described in detail. It will be apparent to one skilled in the art that the present invention may be practiced with variation of these specific details. Hence this invention should not be construed as limited to the embodiments set forth herein.

The present invention is related to a USB hub controller integrated into the apparatus to communicate with a combination of USB devices, which are internal to the apparatus. These include, but not limited to a USB (NAND) flash memory device and or USB hard disk drive (HDD), USB devices with RFID that can adopt the smart card protocol/ USB smart card devices and USB wireless devices.

Recent developments in HDD have resulted in low profile (size), shock resistant drives, such as those from Seagate and Toshiba (0.85 inch in dimension and practically the same size as a SD (Secure Digital) card). And, it is therefore possible to integrate a HDD into the physical form factor of a key chain USB apparatus.

The apparatus of the present invention comprises a digital hub to technology spokes with radio frequency & wireless communication interfaces. The connection input to the apparatus is via USB, but a plurality of other inputs such as FireWire & Serial ATA such as described in previous patent filings is possible.

In an embodiment, the apparatus has a cascade configuration from USB input to the digital hub through the technology spokes to a USB output. The latter can also be in principle an input.

The concept of a portable digital convergence hub for people on the move/go can be summarized with the acronym "ALCATRAS" meaning: Physical Access & Logical Control, Authentication, Transactions, Radio Frequency Communication, Applications and Storage.

Technology Spokes

| Functionality | Description | Format |
|---|---|---|
| Physical Access & Logical Control | Proximity identification using contactless technology & NFC | USB RFID Device |
| + | | |
| User Authentication | Cryptographic smart card based security for logical access | USB Token |
| + | | |
| Transactions: Electronic, Debit/Credit Payments & On-Line & Mobile Commerce | Electronic storage of value in the form of cash, tokens, points, tickets, coupons, vouchers, etc - uploaded and/or downloaded from the virtual world of the Internet and redeemed/tendered in real world transactions. | USB Smart Card |
| + | | |
| RF Wireless & Optical Communication Interfaces | Zigbee, Bluetooth, Wi-Fi, Ultra Wide Band and Infra Red | USB Dongle |
| + | | |
| Input/Output Applications | Interfaces with a host computer via the USB port, alternatively via a FireWire, Serial/Parallel port, Ethernet, etc. | USB to USB Port |
| + | | |
| Mass Storage | Flash memory and/or hard disk drive for storing data files, content, software drivers, hub management software, encryption acceleration software, compression software and applications | USB Memory Drive |

For devices without a universal serial bus, a translator module can convert for example from smart card protocol to USB, from SD card format (9 pin configuration) to USB or from Memory stick to USB.

The standard controller to be found in a hub appliance merely permits bridge communication between the external USB devices and the host computer. Reference: World Wide Web at alcormicro.com In the apparatus the hub controller enables the transmission of data between the internal USB devices. Each technology spoke has its own controller, which in turn is connected to the hub controller.

The USB RFID device can for example be a contactless smart card chip, based on two standards: ISO/IEC 14443 Type A and Type B (for proximity cards), and ISO/IEC 15693 (for vicinity cards).

The USB token can incorporate an Advanced Crypto Engine (ACE), triple DES, ECC and RSA for public and secret key encryption.

The USB smart card can comprise a translator module (USB to ISO 7816 protocol) and a dual interface chip (contact & contactless processor module) or it can be a single chip solution as is the case with the Smart MX (P5CT072), secure triple interface smart card controller from Philips Semiconductors. The on-board memory (EEPROM) is shared and can be accessed either in contact or contactless mode. Reference: World Wide Web at philips.com The USB memory drive can be a flash memory and/or a hard disk drive with memory management controller.

For personal password & PIN protection, PC lock function, digital signing of documents and restricting access to the memory, a fingerprint sensor can be integrated into the apparatus.

The entire circuitry of the USB hub chip, USB peripheral devices, sensors, switches and antenna assembly may be fabricated in the apparatus.

It is within the scope of the invention that the flash memory chip could include smart card functions, encryption technology and RFID capability as well as a wireless communication interface, thus enabling an even more cost effective solution.

The hub management software for the various USB devices can reside in the EEPROM, flash memory or in the hard disk drive. For certain configurations, installation software can be downloaded from the USB apparatus to the host processing device during initialization.

The application clients can include: operating system booting, auto-run, stored value transactions, email management, remote PC access (VPN, virtual private network), customized browser, entertainment content, games, firewall protection, filtering and data encryption.

By inserting the apparatus into a host computer the user can see the graphic layout of the hub and spoke concept. The user can enable or dis-enable a technology spoke simply by clicking on an icon.

Shared Memory

The multi-interface USB tokens that exist on the market today incorporate a transponder device, a flash memory drive and a cryptographic chip. The RFID device is a separate component to the flash memory and security chip, with no electrical inter-connections. It is merely mounted in the token housing assembly. The data that resides in the EEPROM memory of the RFID device cannot be shared with the other electronic components. In short, there is no communication between the devices within the token, when powered up by a host computer or by the energy generated in an electromagnetic field. Reference: World Wide Web at digisafe.com, World Wide Web at kobil.com and World Wide Web at oberthur.com In another example of a technology combination token, incorporating WLAN (801.11 b, g or super g) and flash memory (USB v 2.0), there is no communication or shared memory between the flash memory drive and the wireless dongle. Transmitted data is first transferred to the HDD of a host computer, before it can be stored in the token. The electrical connections of the dongle and flash memory are simply connected to the 4-pin USB connector.

An advantage of the present invention is that all of the technology devices can communicate with each other and each memory can be accessed by either device.

The Ser. No. 11/295,685 patent application also provides insight into a method to cover and protect the USB connector. In expanding on the idea, it is also feasible to have different connectors (USB & FireWire) integrated into the apparatus. This means that the inputs to the apparatus can be interchangeable by pushing the reverse motion slide from its middle position to the right or left.

Active Mode (Self Power)

In another embodiment of the apparatus with battery power, it is feasible to use the memory storage for voice recording in ADPCM (Adaptive Differential Pulse Code Modulation) format. The BLUETOOTH wireless interface can be used to pair with any BLUETOOTH wireless enabled headset for digital playback of the recorded message.

In active mode the apparatus can transmit encrypted data in the EEPROM of the Smart card/RFID chip via the BLUETOOTH wireless interface to an external terminal such as an ATM, cash register, kiosk or any transaction vehicle, in order to engage in an interactive dialog. In a payment/ticketing application, it is feasible to use the RFID and BLUETOOTH wireless technology simultaneously. Acceptance or confirmation of a transaction can be performed by pressing a switch or button.

The active USB apparatus can have a LCD or an OLED (Organic light-emitting diode) display to indicate time, remaining storage space in the memories, previous transactions and general functions.

The same concept is also applicable to the combination of RFID reader & Contactless Fob as outlined in FIG. 2A (above).

A miniature digital camera can also be mounted on the apparatus to take still images in JPEG or video recording in AVI formats. The camera, connected to the USB port of the apparatus, makes use of the memory storage and media data can be transferred to a PC via the wireless interface.

The output of the apparatus can be used as a bridge to store and transfer files & content between any two storage devices without the need of a computer.

A biometric reader can be incorporated into the apparatus, whereby in active mode a BLUETOOTH wireless interface can be used to communicate with the host computer when verifying the fingerprint templates.

For low power requirements, the BLUETOOTH wireless interface can be replaced with a ZIGBEE wireless interface.

Additional Features

As the multi-interface apparatus can be used in a number of mobile office and business solution applications, it is envisaged that the following extensions of the product are feasible:
  Having a slot(s) or hatch(es) to accommodate the insertion of a removable SD, mini SD, MMC, RS-MMC, Intelligent Stick, Memory Stick or Compact Flash card
  Having a hinged or slide cover to hide functions such as key pads, a SIM card module, memory card, display, switches, etc U.S. Pat. Nos. 6,813,164 and 6,744,634 provide insight into a form factor that could be incorporated into the apparatus. The standard dimensions of the stick are L 43.0 mm×W 18.0 mm×T 2.8 mm. The device is compatible with USB standards. Reference: World Wide Web at istick.org or World Wide Web at pqi.com.tw Given that the physical dimensions of the "Intelligent Stick" are determined by the size of the memory chip, it is envisaged that a shrink or miniature version of the housing enclosure could be achieved with a memory chip of low storage capacity. For example, a 16 MB memory chip could be packaged in an enclosure with the dimensions L 24 mm×W 12 mm×T 1.50 mm. As memory chips can be stacked on a printed circuit board, a 32 MB enclosure can have the same length and width dimensions, but the thickness would be 2.70 mm. For stability and durability, a metal piece can be incorporated in the stick to support the low height PCB connector with gold contacts.

This "Mini Intelligent Stick" has the potential to replace SD and MMC cards in a variety of portable appliances and is particularly interesting for auto-run and security applications.

Security can have two directions either authentication (as previously described) or DRM (Digital Rights Management). In the latter case, a music piece can be downloaded from the Internet for a unit cost to the flash memory drive and not to the HDD of the host computer, in order to prevent piracy.

For memory stick identification, a transponder can be embedded into the housing of the removable intelligent stick. The apparatus with in-built RFID reader can be used to identify the product.

As already mentioned, the stick can be inserted into a slot in the apparatus. This also applies to the any form factor including a "clam shell" credit card format.

Multiple Interface Token with an Integrated Gatekeeper Hub

Patent Publication No. WO2004/081706 ('81706), incorporated by reference herein, describes "an apparatus for controlling the provision of digital content, comprising: a data storage device controller for receiving a data storage device on which is provided said content; an authentication data storage device for storing authentication data; a data port connectable to a host device so that said apparatus can be placed into electronic communication with said host device; and a communications hub to mediate electronic communication between said data storage device controller, said authentication data storage device and said data port; wherein said apparatus is configured to permit content provided on said data storage device to be outputted from said data port according to said authentication data".

The apparatus of '81706 comprises of a Universal Serial Bus (USB) hub, an authentication device in the form of a smart card chip (cryptographic processor) or a biometric device, a flash controller for reading flash memory and a USB connector.

The communication hub of '81706 allows for content in the data storage device to be transmitted via the USB port connected to a host device, in accordance with the data stored in the authentication device. Therefore, the content may be read from the data storage device only if a particular password, security key or digital certificate (stored as the authentication data) is provided on the authentication storage device.

Reference is made to commonly-owned, copending U.S. patent application Ser. No. 10/990,296 ('296 application). Generally, as described therein, an apparatus comprises a USB token incorporating a translator module, a dual interface (contact & contactless) processor with radio frequency and wireless communication. The translator module interfaces an ISO 7816 compliant contact smart card with a USB port, for the purpose of emulating smart card operations in a PC environment. Data is transmitted either in contact mode via the translator module to the USB port of a host computer or in contactless mode to an RFID (Radio Frequency Identification) reader.

Reference is made to commonly-owned co-pending U.S. Provisional Application No. 60/652,895. Generally, as described therein, a multiple interface token incorporating a USB controller which is independent of the smart card protocol and capable of managing the memory in a flash drive and the RFID data in a transponder chip.

Reference is made to commonly-owned, copending U.S. Provisional Application No. 60/660,398. Generally, as described therein, a USB hub controller is integrated into the apparatus to communicate with a combination of USB devices, which are internal to the apparatus. These include, but not limited to a USB (NAND) flash memory device and or USB hard disk drive (HDD), USB devices with RFID that can adopt the smart card protocol/USB smart card devices and USB wireless devices.

The architecture of '81706 is satisfactory for controlling the distribution of digital content.

However, in 60/660,398, a USB hub controller is integrated into the apparatus to communicate with a combination of USB devices. The function of the hub controller in the provisional application is to facilitate the transmission of data between the internal devices (referred to as technology spokes) having radio frequency & wireless communication interfaces as well as the data storage devices. Point-to-point transfer of data between the technology spokes is feasible as well as the temporary storage of data in the hub controller. Reference is made to a USB hub, but a plurality of bus connections such as FireWire between the technology spokes and the hub as well as between the hub and the hosting port are feasible.

In the '296 application, reference is also made to a translator module for converting USB protocol to ISO 7816 protocol, however in the preferred embodiment of the invention, the translator module is integrated into the contactless smart card chip with USB and contact smart card interfaces.

The present invention seeks to provide improved multiple interface tokens and provide improved methods for using same.

This aspect/embodiment of the invention is generally a USB hub controller integrated into a multiple interface token to communicate with a combination of USB devices which are internal to the apparatus. These include, but not limited to a USB (NAND) flash memory device and or USB hard disk drive (HDD), USB devices with RFID that can adopt the smart card protocol/USB smart card devices and USB wireless devices.

The hub management software for the various USB devices can reside in the EEPROM, flash memory or in the hard disk drive.

An advantage of the present invention is that all of the technology devices can communicate with each other and each memory can be accessed by either device. (Shared Memory)

According to an embodiment of the invention, a USB apparatus incorporates a USB gatekeeper hub to communicate with several internal USB devices such as Flash Memory; HDD; RFID; Wireless; BLUETOOTH wireless; etc.

The present invention is innovative in that it provides a way to develop mobile applications beyond storage and to allow the internal devices to access or share memory functionality. It is a purpose of the current invention to provide a secure multiple interface apparatus to serve multiple applications (Physical Entry) Access & Logical Control, Authentication, Transactions, Radio frequency & wireless communication, Applications and Storage), using standard USB chip set devices. In addition, the gatekeeper hub is an authentication device allowing a user, for example:

- to access confidential data files in the memory of the apparatus or in a host computing device (Logical Access Control)
- to generate "One Time Password" credentials
- to support two factor authentication
- to store the results of electronic value applications & to support credit or debit charge public key protected clearance schemes—Exchange & Transactions
- to enable authorized downloading of programs or content for execution—Applications
- to communicate via the radio frequency or wireless interfaces with external appliances
- to control operations In elaborating on the functionality of the gatekeeper hub, it is feasible to incorporate in the ASIC (Application Specific Integrated Circuit) hub controller the following:

- The hub controller can have DMA capability to reduce the data transfer time (read/write performance) or can buffer data transfers.

The information storage technique (RAM, EEPROM, Flash, HDD, etc) used by the internal devices can have intrinsic defects that lead to failures at some memory locations. To avoid accessing these erroneous or faulty locations, their address can be stored in the non-volatile memory of the hub controller. In addition, geometry, manufacturer's test codes, security and auxiliary data can be recorded by the hub controller.

Authentication

In the previous patent filing ('296 application), public & private key infrastructure (PKI) for secure authentication has been discussed. The alternative to PKI is the generation of "One Time Passwords" (OTP), based primarily either on an event (session or transaction) or on time.

By inserting the token into a network or Internet-connected PC, requiring client user authentication, the token generates an OTP, for that particular event. The password is compared with the keys at the central authentication server. Normally, the generation of event based OTPs by the token are in sync with the keys stored at the server. However, to overcome any potential problem of synchronization, the token stores the password from the previous event and the server merely compares the new generated password within a range of the previous password. The encryption algorithm, which generates the OTP keys, resides in the flash memory.

As indicated above, the alternative to "Event Based One Time Passwords" is "Time Based". The advantage of this method lies in the fact that passwords are time related and in clock synchronization with the server. A further alternative to event or time based OTP solutions is a counter-based algorithm.

The application for time, event & count based encryption tokens is not only in network security, but also in financial transactions, replacing the PIN/TAN number system used by banks. For added security, a chip reader can be integrated into the token, to communicate with a smart card in SIM format. The smart card can store encryption certificates for PKI infrastructure and to open a secure channel to a bank server.

All three methods (time, event & count) for authenticating an OTP, require a central server. This is particular good in an enterprise environment, but in multiple applications, there are several application specific servers.

The present invention differentiates from time, event and count based OTPs, in the sense that the generation of passwords is dependent on the location of the user, the application and the required level of security. The encryption engine which generates the OTPs resides in the non-volatile memory of the hub controller, or alternatively in the flash memory, EEPROM or in a removable mini intelligent stick.

When the apparatus is in an electromagnetic field for radio frequency identification, the apparatus generates a "One Time Password" for a contactless transaction, such as a micro payment or physical access control to a secure building.

The OTP contains a unique identification header (tag) relating to the application and a random generated password, for authentication by the server processing the micro payment. The server in turn signals the other application servers that an incremental OTP has been processed.

In the application (next transaction requiring a new OTP for authentication), for example electronic or mobile commerce, the apparatus generates an OTP plus an identification header for clearing by the specific validation server. In essence, each server is waiting on an OTP from their application. This procedure enhances the security by the permutations of possible servers.

For online commerce/transactions, the authentication process can require a hybrid solution combining OTP generation and fingerprint verification, in order to prevent phishing. Alternatively, the biometric sensor can be substituted with an RFID reader for electronic identification with a transponder device.

The fingerprint templates are stored in the apparatus in a secure package or bundle, and thereby unreadable if the apparatus is lost.

The apparatus can have a display to indicate the OTPs for manual login.

For convenience purposes, the apparatus can transmit the OTP and the PIN code from the fingerprint verification to a host computer or a reader via one of its interfaces (RF, Wireless, BLUETOOTH wireless, etc).

Those skilled in the art will recognize that many modifications may be made to this configuration without departing from the scope of the present invention. For example, those skilled in the art will recognize that any combination of the above components, or any number of different components, peripherals, and other devices, may be used with the present invention.

Reference is made to commonly-owned co-pending U.S. Provisional Application No. 60/664,974 (C8). Generally, as described therein, a "One Time Password" is generated when the apparatus is performing a transaction in an electromagnetic field for radio frequency identification. A further expansion of this technique is to generate an OTP when the apparatus is in a WLAN area, when performing a contactless or wireless transaction.

Block Diagrams of the Apparatus (FIGS. 3A, 3B, 3C and 3D)

Case 6 (60/652,895, "C6") describes a single chip USB controller that could communicate with a standard low or high frequency transponder chip and a flash memory drive. The controller would manage the memory not only in the NAND flash chip, but also the RFID data in the EEPROM of the transponder chip. An advantage of this technique is that the controller would be independent of the smart card protocol and any RFID device could be used in the USB apparatus.

FIG. 3A illustrates a Single Chip USB Controller with Multiple Interfaces.

In Case 7 (60/660,398, "C7"), reference is made to a USB hub controller integrated into the apparatus to communicate with a combination of USB devices, which are internal to the apparatus. These include, but not limited to a USB (NOR or NAND) flash memory device and or USB hard disk drive (HDD), USB devices with RFID that can adopt the smart card protocol/USB smart card devices and USB wireless devices.

In Case 8 (60/664,974, "C8"), reference is made to a USB apparatus that incorporates a USB gatekeeper hub to communicate with several internal USB devices such as flash memory; HDD; RFID; Wireless; BLUETOOTH wireless; etc, whereby each USB device has it's own microcontroller.

FIG. 3B illustrates a Gate Keeper Version: Portable Multiple Interface USB Token. This version includes USB controller with memory management, operating system and embedded USB hub. Using the same configuration, the USB controller can also perform the function of a USB hub, whereby each USB device has its own internal controller.

Figure 3C:
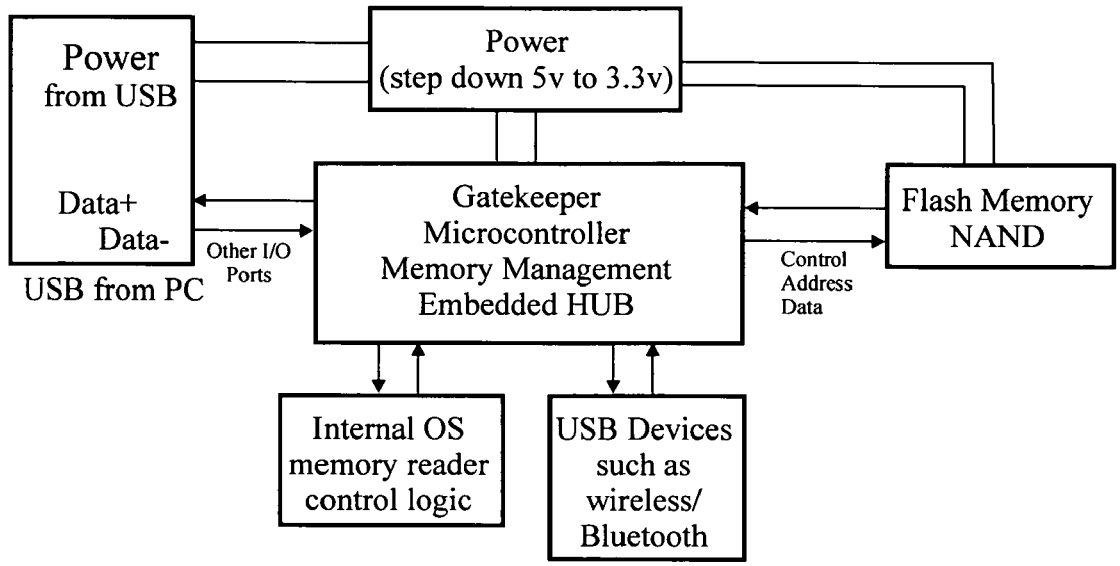
FIG. 3C is a block diagram of an embodiment of the invention.

FIG. 3C illustrates a Portable Storage Device with Wireless Interface. This diagram illustrates the possible power lines to the USB controller.

Figure 3D:
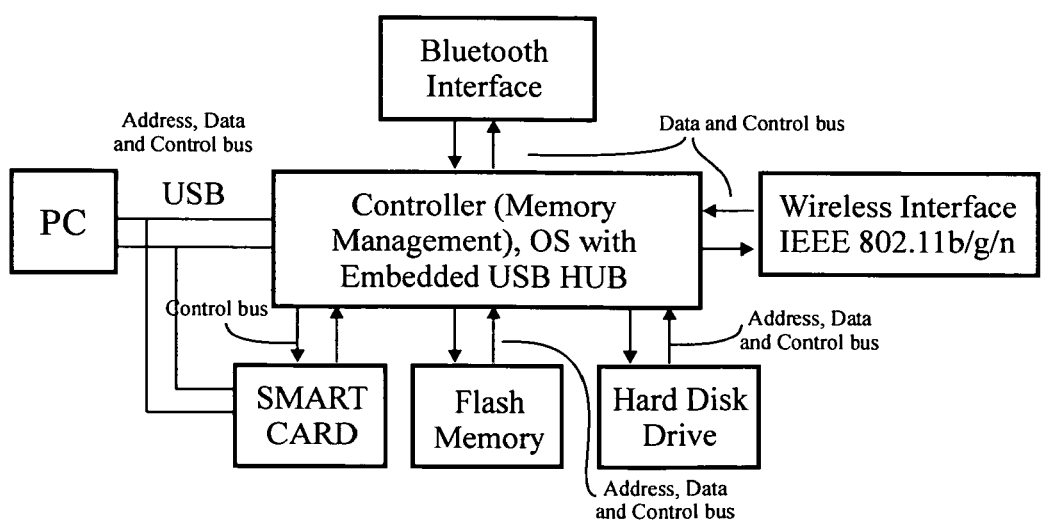
FIG. 3D is a block diagram of an embodiment of the invention.

FIG. 3D illustrates a Hybrid Version: Portable Multiple Interface USB Token. This is believed to be the most versatile version (as compared with FIGS. 3A-3C). This version is similar in design to FIG. 3A, but with the exception that the smart card is hardwired (direct connection) to the USB connector. This helps reduce stress for the gatekeeper controller.

FIGS. 3A, 3B, 3C, 3D all illustrate BLUETOOTH wireless. ZIGBEE wireless and NFC can be used as alternatives to BLUETOOTH wireless in these block diagrams.

TCP/IP Path

The internal wireless device can convert TCP/IP signals to USB signals or alternatively USB serial data directly into wireless signals.

Additional Applications for Multiple Interface Tokens

In Case 6 (C6) reference is made to a single chip USB controller which can communicate with a standard low or high frequency transponder chip and a flash memory drive. The controller manages the memory not only in the NAND flash memory chip, but also the RFID data in the EEPROM of the transponder chip. An advantage of this technique is that the controller is independent of the smart card protocol and any RFID device can be used in the USB apparatus.

The controller in the USB apparatus is a USB client to bus interface controller with sufficient RAM to manage the flash memory and other peripheral devices. It can support multiple transfer interfaces, namely: USB interface, smart card interface (ISO/IEC 7816 contact interface), contactless RF interface, IDE device interface, ATA-IDE interface, I$^2$C device interface and standard parallel & serial data interface buses.

In the aforementioned 60/660,398, reference is made to a USB hub controller integrated into the apparatus to communicate with a combination of USB devices, which are internal to the apparatus. These include, but not limited to a USB (NOR or NAND) flash memory device and or USB hard disk drive (HDD), USB devices with RFID that can adopt the smart card protocol/USB smart card devices and USB wireless devices.

In the aforementioned 60/664,974 reference is made to a USB apparatus that incorporates a USB gatekeeper hub to communicate with several internal USB devices such as flash memory; HDD; RFID; Wireless; BLUETOOTH wireless; etc, whereby each USB device has it's own microcontroller.

In the present invention, consideration is given to power consumption, performance and the modular configuration of the apparatus to include flash memory and or hard disk drive, smart card device(s), transponder(s) and wireless device(s). Power consumption becomes critical when the apparatus is connected to a standard hub device, which in turn is connected to a PC port. As the current consumption from the PC is limited to 500 mA, an intermediary hub can draw significant power from the PC. Therefore, the number of controller chips in the apparatus ought to be limited, to ensure optimal functionality.

An embodiment of the apparatus includes a single chip multiple interface microcontroller with memory management capability, which communicates directly with a combination of block devices such as a non-volatile flash memory chip and/or a hard disk drive, a smart card device, a RFID device with smart card protocol and a wireless device. The controller can be powered by a PC, a portable computing device or it can derive its' energy in contactless mode from an electromagnetic field. An embedded flash in the microcontroller can be used to support firmware upgrading. This configuration eliminates the requirement for an internal hub IC and a separate memory management controller to communicate with a flash memory or a hard disk drive. The block devices have an internal memory, which can be accessed as memory drives.

This single chip solution is a platform for Identification, Exchange, Transactions & Applications, and combines memory management (mass storage protocol), smart card interface (ISO7816 UART Interface), parallel interface for LCD panel and a plurality of standard IC communication interfaces (SPI, I$^2$C, etc). With an ATA interface the controller can be connected to a hard disk drive as the storage media.

The controller can support PC Smart card industry standard (PC/SC) and Microsoft smart card for Windows.

Application software (utilities, drivers, libraries, test program) can resided in the embedded flash memory of the microcontroller, whereby data or programs that remain unchanged can be masked to the ROM.

In another embodiment of the apparatus, the microcontroller with memory management capability has an embedded USB hub, thus enabling the connection of a USB peripheral device, such as a smart card device with USB interface. In this configuration the microcontroller directly communicates & manages the flash and or hard disk memory drive, but communicates with other peripheral devices via one of its USB ports. In addition, general purpose I/O interfaces for LCD display and push buttons can be incorporated into the controller. Although reference is made to USB in all embodiments of the apparatus, other I/O connections such as FireWire (IEEE 1394) are possible.

In a further embodiment of the apparatus, to secure the memories in the apparatus from unauthorized access, a keypad is integrated into the housing of the apparatus. As described in previous provisionals, the apparatus can have the same shape and form of a credit card. The apparatus can be connected to a PC via a cable with USB connector or can communicate via a BLUETOOTH wireless or wireless interface with a USB dongle connected to the USB port of a PC.

To access the data stored in the apparatus, the user is required to enter a default password, by pressing the required keys. The disadvantage of a keypad for the sole purpose of entering, for example a four digit number, is that through wear & tear of the keypads, the password becomes obvious over time to anyone looking at the apparatus. Of course, changing the password on a regular basis is a way of avoiding such a problem but in practice users only use one password.

In the embodiment of the apparatus with keypad, the apparatus incorporates an LCD or OLED display panel, a calculator, a solar panel, functions keys and the general functions as previously described. The display not only illustrates calculations, but also the memory space available at each drive or partition, stored value, One-Time-Passwords, etc. A rescue code concept as used in mobile telephones can be applied, should the user forget their password.

The mechanical design of the apparatus can have a protection cover with display which when unlocked rises to reveal the keypad. The unlocking mechanism can be activated by pressing push-buttons on each side of the apparatus. As the cover is spring loaded and supported by a hinge system, it moves when opening vertically & horizontally simultaneously. Alternatively, a slide cover or a hinged cover as used in mobile telephones can be used to hide the keypad.

The keypad concept for password protection can be replaced by a combination lock, whereby the user is required to turn each wheel to the correct digit position, before being allow access to the data. Alternatively, a joystick and a select switch in combination with a menu display can be used to enter the correct password.

Digital Receipt

The multiple interface token can be used as a payment vehicle, whereby every contactless or wireless transaction generates a digital receipt in the memory of the token. The stored data relating to the processes can be downloaded to an expense report, accountancy software package or any general home banking program. The unique advantage of the digital receipt is the user can track every transaction and compare debit/credit balances at the end of every month.

USB Flash Drive with Double Sided USB Connector

The mechanical connection of the apparatus with a computing device can for example be USB. For the purpose of convenience the USB connector can be double-sided, allowing the user to insert the USB plug in any direction (either face-up or face-down) into a USB port. The same could apply to other types of connectors.

The invention has been illustrated and described in a manner that should be considered as exemplary rather than restrictive in character—it being understood that only preferred embodiments have been shown and described, and that all changes and modifications that come within the spirit of the invention are desired to be protected. Undoubtedly, many other "variations" on the techniques set forth hereinabove will occur to one having ordinary skill in the art to which the present invention most nearly pertains, and such variations are intended to be within the scope of the invention, as disclosed herein.

In wireless communication with the apparatus, a ZIGBEE wireless, NFC or a BLUETOOTH wireless dongle can be inserted into the USB port of a PC to transmit data to the apparatus. Equally as described hereinabove, the USB connector can be double-sided allowing the user to the insert the dongle in anyway.

Summary of Important Features

A USB hub controller integrated into a multiple interface token to communicate with a combination of USB devices, which are internal to the apparatus. These include, but not limited to a USB (NAND) flash memory device and or USB hard disk drive (HDD), USB devices with RFID that can adopt the smart card protocol/USB smart card devices and USB wireless devices.

The hub management software for the various USB devices can reside in the EEPROM, flash memory or in the hard disk drive.

An advantage of the present invention is that all of the technology devices can communicate with each other and each memory can be accessed by either device. (Shared Memory)

The invention describes an alternative to time, event & count "One Time Passwords" in applications using a multiple interface token. When the apparatus is in an electromagnetic field for radio frequency identification, the apparatus generates a "One Time Password" for a contactless transaction, such as a micro payment or physical access control to a secure building.

Field Generated One Time Passwords

Unlike standard One Time Password tokens, which require a battery for operation, the multiple interface token can generate passwords when powered up by the electromagnetic field generated by a RFID reader.

The invention has been illustrated and described in a manner that should be considered as exemplary rather than restrictive in character—it being understood that only preferred embodiments have been shown and described, and that all changes and modifications that come within the spirit of the invention are desired to be protected. Undoubtedly, many other "variations" on the techniques set forth hereinabove will occur to one having ordinary skill in the art to which the present invention most nearly pertains, and such variations are intended to be within the scope of the invention, as disclosed herein.

What is claimed is:

1. A compact personal radio frequency identification (RFID) token apparatus, comprising:
   a connection module;
   a translation module;
   a processor module; and
   an input/output module;
   wherein the connection module is for interfacing the device with an appliance capable of communicating and interacting with remote servers and networks;
   wherein the translation module can move signals between a universal serial bus (USB) interface and a smart card interface, and the smart card interface is selected from the group consisting of International Organization for Standardization (ISO) standard 7816, ISO standard 14443 & ISO standard 15693 and near field communication (NFC);
   wherein the processor module is capable of operating as a dual-interface (DI) chip; and
   wherein the input/output module comprises at least one radio frequency (RF) antenna and a modulator;
   further comprising:
   a standard-compliant contactless interface and a wireless interface;
   wherein the contactless interface complies to one or more of the following standard interfaces: RFID-contactless interface according to ISO 14443 & ISO 15693 and Near Field Communication (NFC); and
   wherein the wireless interface comprises at least one of the interfaces selected from the group consisting of ZIGBEE wireless, BLUETOOTH wireless, wireless local area network (WLAN) 802.11, Ultra Wide Band (UWB), and Universal Serial Bus (USB) wireless.

2. The compact personal RFID token apparatus of claim 1, wherein:
   the translation module is incorporated in the processor module and can move signals between a USB interface and a smart card interface.

3. The compact personal RFID token apparatus of claim 1, wherein:
   the translation module is incorporated in the processor module and can move signals and data directly from USB to Contactless without being limited by smart card software architecture limitations.

4. The compact personal RFID token apparatus of claim 1, further comprising:
   flash memory.

5. The compact personal RFID token apparatus of claim 4, wherein:
   the processor module comprises a dual interface (DI) chip; and
   the translation module moves data or signals from a USB interface to a contact interface (smart card protocol) of the processor module with storage of data in the flash memory or in an electrically erasable programmable read-only memory (EEPROM) of the processor module.

6. The compact personal RFID token apparatus of claim 5, further comprising:
   a triple interface processor including contact, contactless and USB.

7. The compact personal RFID token apparatus of claim 6, further comprising:
   means for transferring messages and data from the contactless interface to the wireless interface in active mode and to run contactless to wireless applications.

8. The compact personal RFID token apparatus of claim 1, wherein:
   the personal RFID token apparatus is configured for interfacing with the Internet and emulating a smart card.

9. The compact personal RFID token apparatus of claim 1, wherein:
   the connection, translation and processor modules enable the download of content or value data from the virtual world of the Internet to the internal memory of the apparatus and the use of the content or value data in the real world via it's contactless RFID interface operating in a passive mode.

10. The compact personal RFID token apparatus of claim 9, wherein:
    the data stored in the personal token apparatus via the standard contact based interface is used for personal identification, secure network logon, access control, e-ticketing, e-payment and similar applications using either the standard compliant interface or the RFID-compliant interface.

11. The compact personal RFID token apparatus of claim 10, wherein:
    data received through the RFID-interface can be stored in the memory of the personal RFID token apparatus and can then be provided to the host processing device via the standard interface, thus allowing a complete information exchange between the virtual world and the real world.

12. The compact personal RFID token apparatus of claim 1, wherein:
    the apparatus has an interface with an Internet-capable appliance; and
    the interface with the Internet-capable appliance is selected from the group consisting of ZIGBEE wireless, NFC, BLUETOOTH wireless, wireless local area network (WLAN), Ultra Wide Band (UWB), and USB wireless or optically via Infrared.

13. The compact personal RFID token apparatus of claim 1, further comprising:
    a standard-compliant connection based interface, the connection based interface complying to at least one standard interface selected from the group consisting of universal serial bus (USB), Institute Of Electrical And Electronics Engineers (IEEE) 1394, Personal Computer Memory Card International Association (PCMCIA), Compact Flash, Multi Media, Memory Stick, Smart Media, Secure Digital, mini SD, International Business Machines (IBM) Micro Drive, and any similar standard interface.

* * * * *